US011258483B2

United States Patent
Takano

(10) Patent No.: US 11,258,483 B2
(45) Date of Patent: Feb. 22, 2022

(54) COMMUNICATION DEVICE, COMMUNICATION METHOD, AND RECORDING MEDIUM

(71) Applicant: Sony Corporation, Tokyo (JP)

(72) Inventor: Hiroaki Takano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/257,014

(22) PCT Filed: Jul. 26, 2019

(86) PCT No.: PCT/JP2019/029521
§ 371 (c)(1),
(2) Date: Dec. 30, 2020

(87) PCT Pub. No.: WO2020/031762
PCT Pub. Date: Feb. 13, 2020

(65) Prior Publication Data
US 2021/0281294 A1    Sep. 9, 2021

(30) Foreign Application Priority Data

Aug. 9, 2018    (JP) .............................. JP2018-150416

(51) Int. Cl.
*H04B 7/0408*    (2017.01)
*H04B 7/06*    (2006.01)
(Continued)

(52) U.S. Cl.
CPC ......... *H04B 7/0408* (2013.01); *H04B 7/0691* (2013.01); *H04B 7/10* (2013.01);
(Continued)

(58) Field of Classification Search
CPC .................................................. H04B 7/0408
See application file for complete search history.

(56) References Cited

U.S. PATENT DOCUMENTS

2006/0035676 A1* 2/2006 Sayers ................... H01Q 1/246
                                                            455/562.1
2013/0286960 A1    10/2013 Li et al.
(Continued)

FOREIGN PATENT DOCUMENTS

JP    2015-523757 A    8/2015
JP    2017-531352 A    10/2017
(Continued)

OTHER PUBLICATIONS

International Search Report and Written Opinion dated Sep. 10, 2019, received for PCT Application No. PCT/JP2019/029521, Filed on Jul. 26, 2019, 11 pages including English Translation.
(Continued)

*Primary Examiner* — Hsinchun Liao
(74) *Attorney, Agent, or Firm* — Xsensus, LLP

(57) ABSTRACT

Provided is a mechanism that enables appropriate resource setting with respect to a terminal device including a plurality of antenna panels. A communication device includes: a plurality of antenna panels (70) each including one or more antennas; and a control section (240) that reports, to a base station, report information regarding the number of beams that are transmittable or receivable in a same time resource on the basis of configurations of a plurality of the antenna panels.

8 Claims, 16 Drawing Sheets

(51) Int. Cl.
H04B 7/10 (2017.01)
H04L 5/00 (2006.01)
H04B 7/0417 (2017.01)

(52) U.S. Cl.
CPC .......... *H04L 5/0005* (2013.01); *H04B 7/0417* (2013.01); *H04B 7/0695* (2013.01)

(56) References Cited

U.S. PATENT DOCUMENTS

| 2016/0044517 | A1 | 2/2016 | Raghavan et al. | |
|---|---|---|---|---|
| 2018/0115957 | A1 | 4/2018 | Lin et al. | |
| 2018/0176065 | A1* | 6/2018 | Deng | H04B 7/088 |
| 2018/0219660 | A1* | 8/2018 | Cezanne | H04B 7/0408 |

FOREIGN PATENT DOCUMENTS

| JP | 2018-74576 A | 5/2018 |
|---|---|---|
| WO | 2018/031869 A1 | 2/2018 |
| WO | 2018/084616 A1 | 5/2018 |

OTHER PUBLICATIONS

Nokia et al., "Multi-Panel UL MIMO Transmission", 3GPP TSG-RAN WG1 No. 88, R1-1703156, Feb. 13-17, 2017, 4 pages.

Nokia et al., "Beam Indication, Measurements and Reporting", 3GPP TSG RAN WG1 Meeting No. 91, R1-1720890, Nov. 27-Dec. 1, 2017, 12 pages.

Huawei et al., "Considerations on the Mapping between PDCCH occasion and beam for OSI", 3GPP TSG RAN WG2 Meeting No. AH-1807, R2-1810126, Jul. 2-6, 2018, 3 pages.

Qualcomm Incorporated, "On Multi-TRP and Multi-Panel Transmission", 3GPP TSG RAN WG1 No. 90, R1-1713391, Aug. 21-25, 2017, pp. 1-4.

OPPO, "Discussion on Simultaneous Reception/Transmission of Multiple Signals/Channels", 3GPP TSG RAN WG1 Meeting No. 93, R1-1806842, May 21-25, 2018, 4 pages.

* cited by examiner

COMMUNICATION DEVICE, COMMUNICATION METHOD, AND RECORDING MEDIUM

CROSS-REFERENCE TO RELATED APPLICATIONS

The present application is based on PCT filing PCT/JP2019/029521, filed Jul. 26, 2019, which claims priority to JP 2018-150416, filed Aug. 9, 2018, the entire contents of each are incorporated herein by reference.

TECHNICAL FIELD

The present disclosure relates to a communication device, a communication method, and a recording medium.

BACKGROUND ART

A wireless access scheme and wireless network (hereinafter, also referred to as "Long Term Evolution (LTE)", "LTE-Advanced (LTE-A)", "LTE-Advanced Pro (LTE-A Pro)", "5th Generation (5G)", "New Radio (NR)", "New Radio Access Technology (NRAT)", "Evolved Universal Terrestrial Radio Access (EUTRA)", or "Further EUTRA (FEUTRA)") for cellular mobile communication have been studied in the 3rd Generation Partnership Project (3GPP). Note that, in the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and a gNodeB in NR, and a terminal device (mobile station, mobile station device, or terminal) is also referred to as a user equipment (UE). LTE and NR are cellular communication systems in which a plurality of areas covered by base stations is arranged in a form of cells. A single base station may manage a plurality of cells.

In NR, it has been considered to provide a plurality of antenna panels in a base station and a terminal device and simultaneously transmit or receive beams in different directions by each antenna panel. The antenna panel is a device on which a plurality of antenna elements is mounted. For example, Non-Patent Document 1 below discloses a technology in which a terminal device, in which a plurality of antenna panels (sub-arrays) is provided at different positions, respectively, simultaneously transmits beams in different directions using the respective antenna panels.

CITATION LIST

Non-Patent Document

Non-Patent Document 1: Qualcomm Incorporated, "On multi-TRP and multi-panel transmission", R1-1713391, 3GPP TSG RAN WG1 #90, August 2017

SUMMARY OF THE INVENTION

Problems to be Solved by the Invention

A beam can be transmitted or received by each antenna panel in the same time resource. Therefore, it is desirable that resource setting for reception or transmission of a measurement signal transmitted or received using a beam is performed according to a configuration of an antenna panel, such as the number of antenna panels or the like. However, the configuration of the antenna panel provided in the terminal device is typically not uniform. Therefore, it may be difficult for the base station to appropriately perform resource setting for transmission or reception of a measurement signal using a beam with respect to the terminal device including a plurality of antenna panels.

Therefore, the present disclosure provides a mechanism that enables appropriate resource setting with respect to a terminal device including a plurality of antenna panels.

Solutions to Problems

According to the present disclosure, a communication device is provided, the communication device including: a plurality of antenna panels that each includes one or more antennas; and a control section that reports, to a base station, report information regarding the number of beams that are transmittable or receivable in the same time resource on the basis of configurations of a plurality of the antenna panels.

Further, according to the present disclosure, a communication method is provided, the communication method including: reporting, by a communication device including a plurality of antenna panels that each includes one or more antennas, report information regarding the number of beams that are transmittable or receivable in the same time resource to a base station on the basis of configurations of a plurality of the antenna panels.

Further, according to the present disclosure, a recording medium in which a program for causing a computer to function as a control section is recorded is provided, the computer controlling a communication device including a plurality of antenna panels that each includes one or more antennas, and the control section reporting, to a base station, report information regarding the number of beams that are transmittable or receivable in the same time resource on the basis of configurations of a plurality of the antenna panels.

Effects of the Invention

According to the present disclosure, a mechanism that enables appropriate resource setting with respect to a terminal device including a plurality of antenna panels is provided. Note that effects of the present disclosure are not necessarily limited to the effects described above, and, along with or instead of the effects described above, any of the effects shown in the present specification, or other effects that can be grasped from the present specification may be achieved.

MODE FOR CARRYING OUT THE INVENTION

Figure 1:
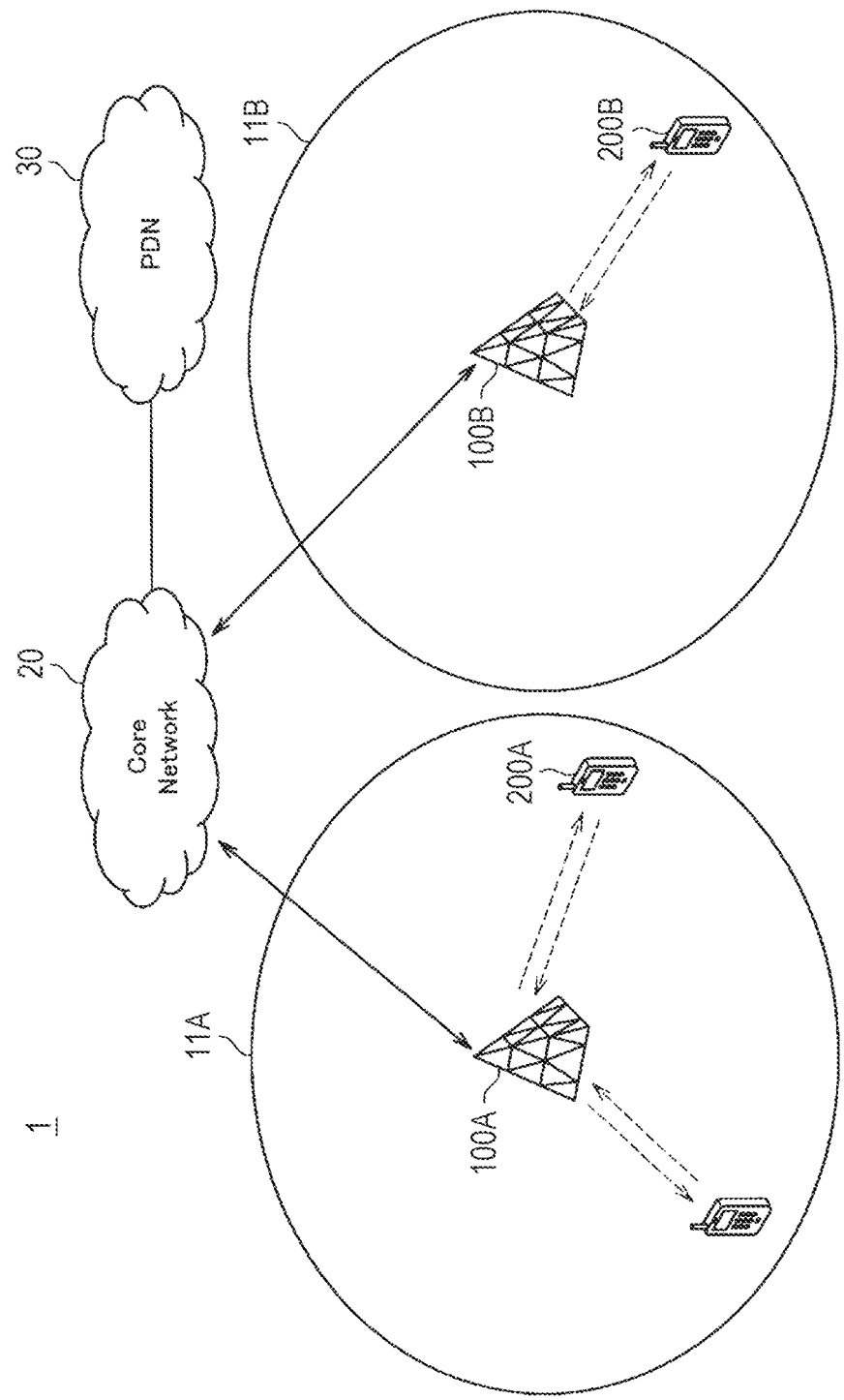
FIG. 1 is a diagram illustrating an example of an overall configuration of a system according to an embodiment of the present disclosure.

Hereinafter, a preferred embodiment of the present disclosure will be described in detail with reference to the accompanying drawings. Note that in the present specification and the drawings, components having substantially the same functional configuration will be denoted by the same reference numerals, and redundant description will be omitted.

Note that descriptions will be provided in the following order.

1. Introduction
1.1. System Configuration
1.2. Related Technologies
2. Example of Configuration
2.1. Example of Configuration of Base Station
2.2. Example of Configuration of Terminal Device
3. First Embodiment
3.1. Technical Problem
3.2. Technical Features
4. Second Embodiment
4.1. Technical Problem
4.2. Technical Features
5. Third Embodiment
5.1. Technical Problem
5.2. Technical Features
6. Application Example
7. Conclusion 1. Introduction <1.1. System Configuration>

FIG. 1 is a diagram illustrating an example of an overall configuration of a system 1 according to an embodiment of the present disclosure. As illustrated in FIG. 1, the system 1 includes base stations 100 (100A and 100B), terminal devices 200 (200A and 200B), a core network 20, and a packet data network (PDN) 30.

The base station 100 is a communication device that operates a cell 11 (11A or 11B) and provides a wireless service to one or more terminal devices located inside the cell 11. For example, the base station 100A provides the wireless service to the terminal device 200A, and the base station 100B provides the wireless service to the terminal device 200B. The cell 11 can be operated according to an arbitrary wireless communication scheme such as LTE, New Radio (NR), or the like. The base station 100 is connected to the core network 20. The core network 20 is connected to the PDN 30.

The core network 20 can include, for example, a mobility management entity (MME), a serving gateway (S-GW), a PDN gateway (P-GW), a policy and charging rule function (PCRF), and a home subscriber server (HSS). The MME is a control node that handles a control plane signal, and manages a movement state of the terminal device. The S-GW is a control node that handles a user plane signal, and is a gateway device that switches between user data transfer paths. The P-GW is a control node that handles a user plane signal, and is a gateway device that serves as a connection point between the core network 20 and the PDN 30. The PCRF is a control node that performs a control related to policies such as quality of service (QoS) and the like for bearers and charging. The HSS is a control node that handles subscriber data and performs a service control.

The terminal device 200 is a communication device that performs wireless communication with the base station 100 on the basis of the control performed by the base station 100. The terminal device 200 may be a so-called user equipment (UE). For example, the terminal device 200 transmits an uplink signal to the base station 100 and receives a downlink signal from the base station 100.

<1.2. Related Technologies>

(1) BWP

Figure 2:
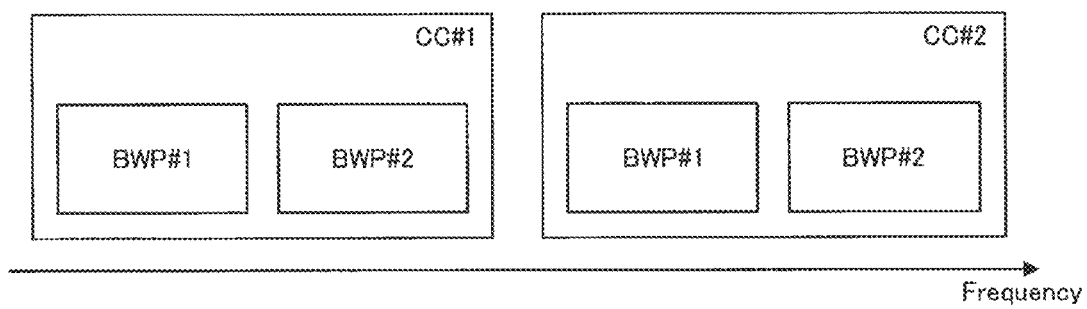
FIG. 2 is a diagram for describing a BWP.

FIG. 2 is a diagram for describing a bandwidth part (BWP). As illustrated in FIG. 2, a CC #1 includes a plurality of BWPs (#1 and #2), and a CC #2 includes a plurality of BWPs (#1 and #2). Note that, in the present specification, a number after # indicates an index. BWPs included in different CCs indicate different BWPs even in a case where they have the same index. The BWPs are a plurality of frequency bandwidths into which a CC, which is one operation bandwidth, is divided. A different subcarrier spacing can be set for each BWP.

The BWP has been standardized as a basic frame format for NR in 3GPP Rel 15. In an OFDM modulation scheme standardized by Rel8 for LTE, the subcarrier spacing was fixed at 15 kHz. On the other hand, in Rel 15, the subcarrier spacing can be set to 60 kHz, 120 kHz, or 240 kHz. The longer the subcarrier spacing, the smaller the OFDM symbol length. For example, in LTE, since the subcarrier spacing is 15 kHz, it has been possible to transmit one slot per ms, in other words, it has been possible to transmit 14 OFDM symbols. On the other hand, in NR, it is possible to transmit two slots in a case where the subcarrier spacing is 60 kHz, four slots in a case where the subcarrier spacing is 120 kHz, and eight slots in a case where the subcarrier spacing is 240 kHz. As such, the longer the subcarrier, the smaller the OFDM symbol length. Therefore, it is possible to provide a frame configuration suitable for low-delay communication.

In NR, BWPs with different subcarrier spacings can be provided at the same time. Therefore, in NR, a plurality of BWPs corresponding to different use cases can be provided at the same time.

(2) Number of Active BWPs

A BWP on which transmission and reception can be performed is also referred to as an active BWP. Further, the number of BWPs on which transmission and reception can be performed at the same time is also referred to as the number of active BWPs. The number of active BWPs of the base station 100 is plural. On the other hand, the number of active BWPs of the terminal device 200 may be one. It is a matter of course that a terminal device 200 with a plurality of active BWPs can also be expected to appear in the future. These scenarios are shown in Table 1 below.

TABLE 1

Scenarios Related to Number of Active BWPs

| Scenarios | Active BWP |
|---|---|
| 3GPP Rel15 | Terminal Device Can Use Only One BWP at the Same Time |
| Possible Scenario in Future | Terminal Device Can Use a Plurality of BWPs at the Same Time |

Note that, in the technology according to the present disclosure, it is assumed that the number of active BWPs of the terminal device 200 is plural.

(3) Codebook-Based Beamforming

The base station 100 can improve, for example, communication quality, by performing beamforming to perform communication with the terminal device 200. A beamforming method includes a method of generating a beam that follows the terminal device 200 and a method of selecting, from candidate beams, a beam that follows the terminal device 200. It is difficult to adopt the former method in future wireless communication systems (for example, 5G) because a computational cost is involved each time a beam is generated. On the other hand, the latter method is adopted also in full dimension multiple input multiple output (FD-MIMO) of release 13 of third generation partnership project (3GPP). The latter method is also referred to as codebook-based beamforming.

In the codebook-based forming, the base station 100 prepares (that is, generates) a beam in all directions in advance, selects, from the beams prepared in advance, a beam suitable for a target terminal device 200, and performs communication with the terminal device 200 using the selected beam. For example, in a case where the base station 100 can perform communication at 360 degrees in a horizontal direction, for example, 360 types of beams are prepared in increments of 1 degree. In a case where the beams are set so that the beams overlap with each other by half, the base station 100 prepares 720 types of beams. In a vertical direction, the base station 100 prepares beams corresponding to 180 degrees, for example, from −90 degrees to +90 degrees.

Note that since the terminal device 200 only observes the beam, there is less necessary to know the existence of a codebook in the base station 100.

Hereinafter, a plurality of beams prepared in advance by the base station 100 is also referred to as a beam group. The beam group can be defined for each frequency band, for example. Furthermore, the beam group can be defined for each Rx/Tx beam and for each of downlink/uplink.

(4) Beam Sweeping

In NR, it has been considered to perform beam sweeping, in which a measurement signal (known signal) is transmitted or received using each of a plurality of beams belonging to a beam group, in order to select an optimal beam to be used for communication. The measurement signal may also be referred to as a reference signal. An optimal transmission beam (hereinafter, also referred to as a Tx beam) can be selected on the basis of a measurement result of the measurement signal transmitted while performing beam sweeping. An example thereof will be described with reference to FIG. 3.

Figure 3:
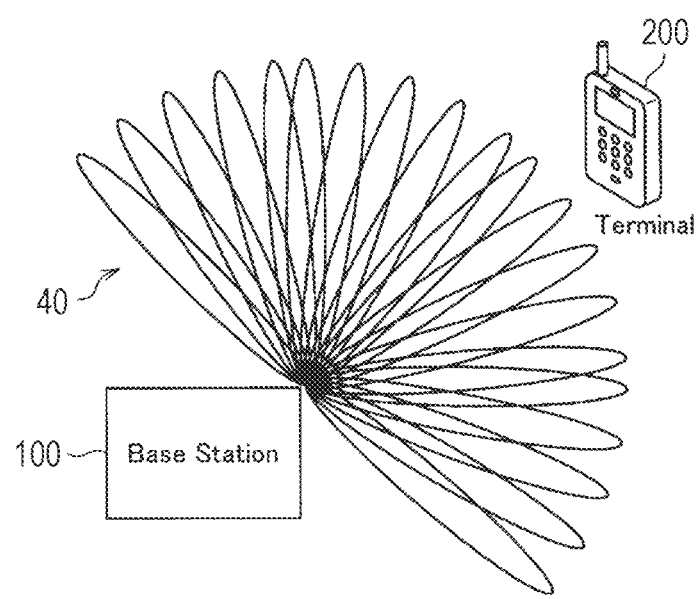
FIG. 3 is a diagram for describing beam sweeping.

FIG. 3 is a diagram for describing the beam sweeping. In the example illustrated in FIG. 3, the base station 100 transmits a measurement signal while performing the beam sweeping (that is, switching the Tx beam) by using a beam group 40. Note that, hereinafter, transmission while the beam sweeping is performed is also referred to as beam sweeping transmission. Further, the terminal device 200 measures a beam-sweeping transmitted measurement signal and determines which Tx beam is the most suitable for reception. In this way, the optimal Tx beam of the base station 100 is selected. Note that the base station 100 can select an optimal Tx beam of the terminal device 200 by exchanging the base station 100 and the terminal device 200 and performing a similar procedure.

On the other hand, an optimal reception beam (hereinafter, also referred to as an Rx beam) can be selected on the basis of a measurement result obtained by receiving a measurement signal while performing the beam sweeping. For example, the terminal device 200 transmits a measurement signal in uplink. Then, the base station 100 receives the measurement signal while performing the beam sweeping (that is, switching the Rx beam), and determines which Rx beam is the most suitable for reception. In this way, the optimal Rx beam of the base station 100 is selected. Note that the terminal device 200 can select an optimal Rx beam of the terminal device 200 by exchanging the base station 100 and the terminal device 200 and performing a similar procedure. Further, hereinafter, reception while the beam sweeping is performed is also referred to as beam sweeping reception.

A side that receives and measures a beam-sweeping transmitted measurement signal reports a measurement result to a side that transmits the measurement signal. The measurement result includes information indicating which Tx beam is optimal. The optimal Tx beam is, for example, a Tx beam with the highest received power. The measurement result may include information indicating one Tx beam with the highest received power, or may include information indicating the top K Tx beams with high received power. The measurement result includes, for example, identification information of a Tx beam (for example, an index of a beam) and information indicating the magnitude of received power of a Tx beam (for example, reference signal received power (RSRP)) in association with each other.

Note that, in the Tx beam selection procedure, a measurement signal is beam-sweeping transmitted by using each of a plurality of Tx beams belonging to a beam group. It can be said that each Tx beam is identified by a resource called a measurement signal. The measurement signal transmitted using a beam may also be referred to as a beam resource. Furthermore, a measurement signal that is beam-sweeping transmitted by using a beam group may also be referred to as a beam resource group.

(5) Relationship Between Beam Sweeping and Resource

The measurement signal is transmitted or received using one beam in one resource. The resource here is a wireless resource defined by a frequency resource and a time resource. For example, in a case where 10 resources are allocated to the terminal device 200, the terminal device 200 can perform beam sweeping to transmit or receive beams in 10 different directions. Such a plurality of resources allocated for the beam sweeping is also collectively referred to as a resource set. For example, in a case where a resource set including 10 resources is allocated, the terminal device 200 can perform the beam sweeping to transmit or receive beams in 10 different directions.

(6) CSI Acquisition Procedure

A channel state information (CSI) acquisition procedure is performed after an optimal beam is selected by the beam selection procedure accompanied by the beam sweeping described above. The channel quality in communication using the selected beam is acquired by performing the CSI acquisition procedure. For example, a channel quality indicator (CQI) is acquired in the CSI acquisition procedure.

The channel quality is used to determine a communication parameter such as a modulation scheme or the like. In a case where a modulation scheme that can transmit only a small number of bits, even with a favorable channel quality, for example, quadrature phase shift keying (QPSK), is adopted, a throughput is low. On the other hand, in a case where a modulation scheme that can transmit a large number of bits even with a poor channel quality, for example, 256-quadrature amplitude modulation (256-QAM), is adopted, data reception fails on a reception side and a throughput is low. As such, it is important to acquire the channel quality correctly in improving a throughput.

Figure 4:
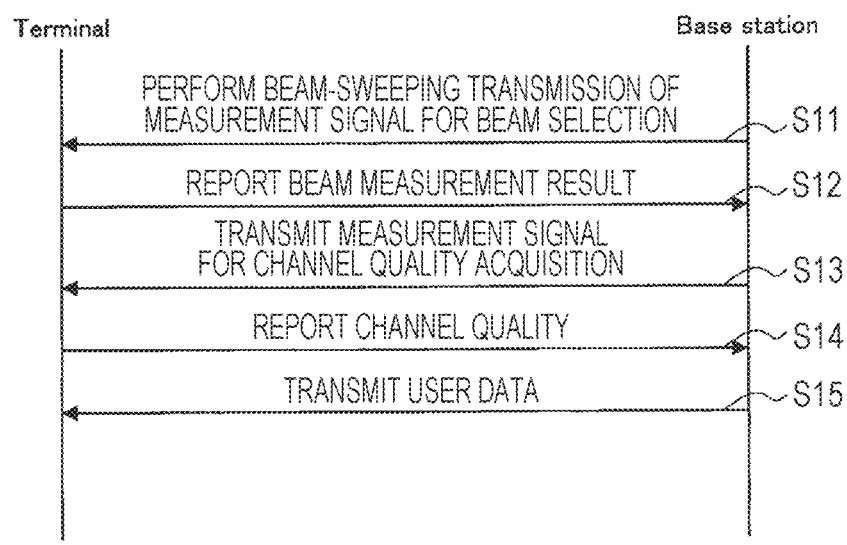
FIG. 4 is a sequence diagram illustrating an example of a flow of a typical beam selection procedure and CSI acquisition procedure performed by a base station and a terminal device.

FIG. 4 is a sequence diagram illustrating an example of a flow of a typical beam selection procedure and CSI acquisition procedure performed by a base station and a terminal device. As illustrated in FIG. 4, the base station performs beam-sweeping transmission of a measurement signal for beam selection (Step S11). Next, the terminal device measures the measurement signal for beam selection and reports a beam measurement result to the base station (Step S12). Such a measurement result includes, for example, information indicating a result of selection of an optimal Tx beam of the base station. Next, the base station transmits a measurement signal for channel quality acquisition by using the selected optimal beam (Step S13). Next, the terminal device reports the channel quality acquired on the basis of a measurement result of the measurement signal to the base station (Step S14). Then, the base station transmits user data to the terminal device by using a communication parameter based on the reported channel quality (Step S15).

(7) Channel Reciprocity

Downlink channel quality is measured on the basis of a measurement signal transmitted in downlink. On the other hand, the downlink channel quality can also be measured on the basis of a measurement signal transmitted in uplink. This is because an uplink channel and a downlink channel have reversibility, and the quality of these channels is basically the same. Such reversibility is also referred to as channel reciprocity.

In a case of measuring the downlink channel quality on the basis of a downlink measurement signal, a measurement result of the measurement signal for channel quality acquisition is reported as shown in Step S14 of FIG. 4. Such reporting of a measurement result can cause significant overhead. A channel can be represented by an N×M matrix, in which the number of transmitting antennas is M and the number of receiving antennas is N. Each element of the matrix is a complex number corresponding to IQ. For example, in a case where each I/Q is represented by 10 bits, the number of transmitting antennas is 100, and the number of receiving antennas is 8, 16000 (8×100×2×10) bits are required for reporting a channel quality measurement result, which causes significant overhead.

On the other hand, in a case of measuring the downlink channel quality on the basis of an uplink measurement signal, it is not necessary to report a measurement result, because an entity that performs the measurement is a base station. Therefore, it is possible to reduce the overhead related to reporting of a measurement result and improve a throughput by measuring the downlink channel quality on the basis of an uplink measurement signal. A flow of processing in a case of measuring the downlink channel quality on the basis of an uplink measurement signal will be described with reference to FIG. 5.

Figure 5:
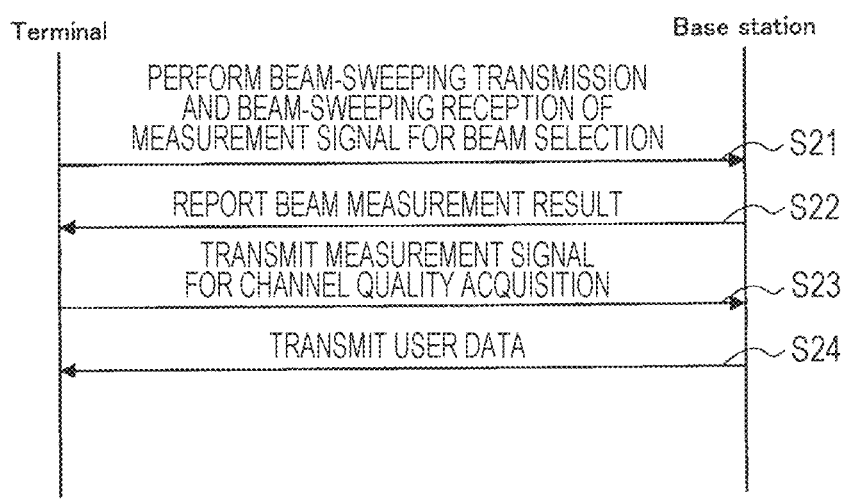
FIG. 5 is a sequence diagram illustrating another example of the flow of the typical beam selection procedure and CSI acquisition procedure performed by a base station and a terminal device.

FIG. 5 is a sequence diagram illustrating another example of the flow of the typical beam selection procedure and CSI acquisition procedure performed by a base station and a terminal device. As illustrated in FIG. 5, the terminal device performs beam-sweeping transmission of a measurement signal for beam selection, and the base station receives the measurement signal while performing beam sweeping (Step S21). Here, the base station selects an optimal Tx beam of the terminal device and an optimal Rx beam of the base station on the basis of a measurement result. Next, the base station reports a beam measurement result to the terminal device (Step S22). Such a measurement result includes information indicating a result of selection of an optimal Tx beam of the terminal device. Next, the terminal device transmits a measurement signal for channel quality acquisition by using the selected Tx beam (Step S23). The base station acquires uplink channel quality on the basis of the measurement result, and acquires downlink channel quality on the basis of the uplink channel quality. Then, the base station transmits user data to the terminal device by using a communication parameter based on the acquired downlink channel quality (Step S24).

(8) Hybrid Analogue-Digital Antenna Architecture

An architecture in which all processing is performed by an analogue circuit can be considered in order to control the directivity of the antenna. Such an architecture is also referred to as a fully digital architecture. In the fully digital architecture, as many antenna weights as antennas (that is, antenna elements) are applied in a digital domain (that is, by a digital circuit) to control the directivity of the antenna. The antenna weight is a weight for controlling the amplitude and phase. However, the fully digital architecture has a disadvantage in that the digital circuit is large. A hybrid analogue-digital antenna architecture is an architecture that eliminates such a drawback of the fully digital architecture.

Figure 6:
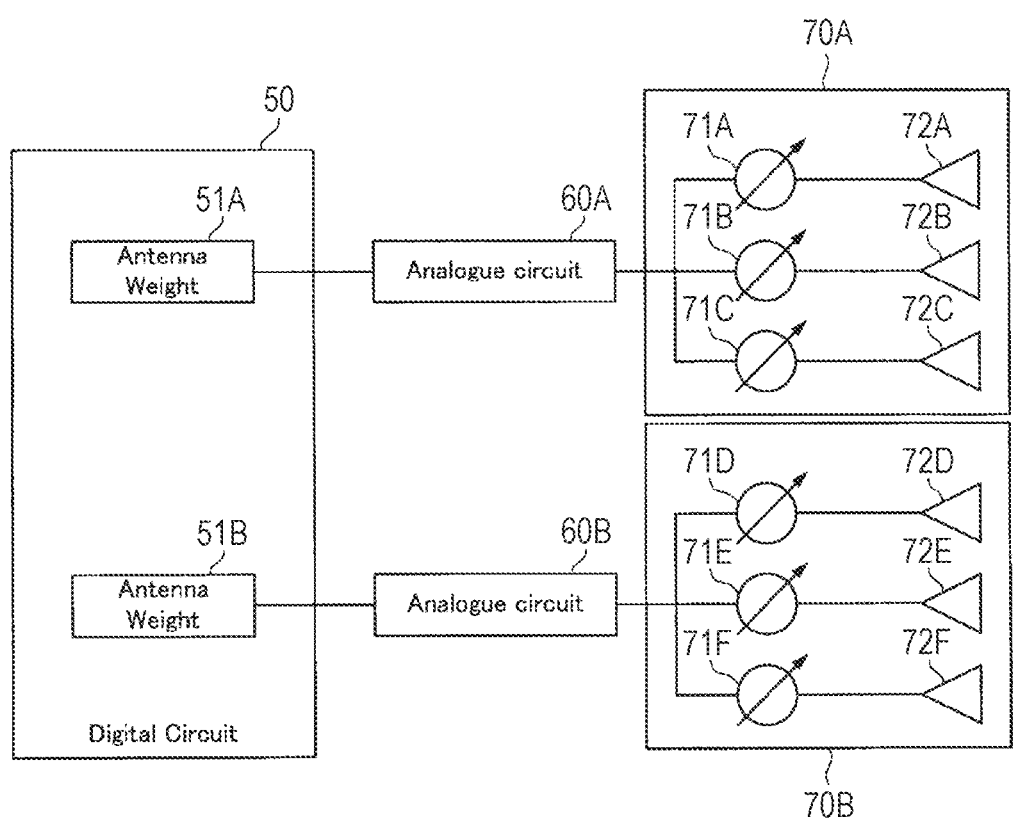
FIG. 6 is a diagram for describing an example of a hybrid analogue-digital antenna architecture.

FIG. 6 is a diagram for describing an example of the hybrid analogue-digital antenna architecture. The architecture illustrated in FIG. 6 includes a digital circuit 50, analogue circuits 60 (60A and 60B), and antenna panels 70

(70A and 70B). The digital circuit can apply a plurality of antenna weights 51 (51A and 51B). Further, the number of provided analogue circuits 60 and the number of provided antenna panels 70 are the same as the number of antenna weights 51 that can be applied in the digital circuit 50. In the antenna panel 70, a plurality of antennas 72 (72A to 72F) and as many phase shifters 71 (71A to 71F) as the antennas 72 are provided. The phase shifter 71 is a device that applies an antenna weight that can control only the phase in an analogue domain.

A characteristic of the antenna weight in the digital domain and the antenna weight in the analogue domain are shown in the following Table 2.

TABLE 2

Characteristic of Antenna Weight in Digital Domain and Antenna Weight in Analogue Domain

|  | Analogue Domain | Digital Domain |
| --- | --- | --- |
| Controllable Content | Phase | Amplitude and Phase |
| Analogue or Digital | Analogue | Digital |
| Whether Application Position Is Time Domain or Frequency Domain | Time Domain | In Case of OFDM Modulation Scheme, Application Is Made in Frequency Domain Before FFT on Transmission Side, and Application Is Made in Frequency Domain After IFFT on Reception Side |
| Whether or Not Different Beams Can Be Provided Using Different Frequency Resources for the Same Time Resource | Not Possible | Possible |

The antenna weight in the digital domain is applied in a frequency domain in a case where an orthogonal frequency division multiplexing (OFDM) modulation scheme is used. For example, the antenna weight in the digital domain is applied before an inverse fast Fourier transform (IFFT) at the time of transmission and is applied after a fast Fourier transform (FFT) at the time of reception.

The antenna weight in the digital domain is applied in the frequency domain. Therefore, by applying the antenna weight in the digital domain, it is possible to transmit beams in different directions by using different frequency resources even in the same time resource. On the other hand, the antenna weight in the analogue domain is applied in a time domain. Therefore, even in a case where the antenna weight in the analogue domain is applied, the beam can be directed only in the same direction over all frequency resources in the same time resource.

That is, for each antenna panel 70, it is possible to transmit beams in different directions by using different frequency resources even in the same time resource. On the other hand, one antenna panel 70 can direct the beam in only one direction by using the same time resource and frequency resource. Therefore, in the hybrid analogue-digital antenna architecture, the number of directions in which the beam can be transmitted and received in the same time resource corresponds to the number of antenna panels 70. Furthermore, in the hybrid analogue-digital antenna architecture, the number of beam groups that can be beam-sweeping transmitted or beam-sweeping received in the same time resource corresponds to the number of antenna panels 70.

Such a hybrid analogue-digital antenna architecture can be adopted in both the base station 100 and the terminal device 200.

2. Example of Configuration

<2.1. Example of Configuration of Base Station>

Figure 7:
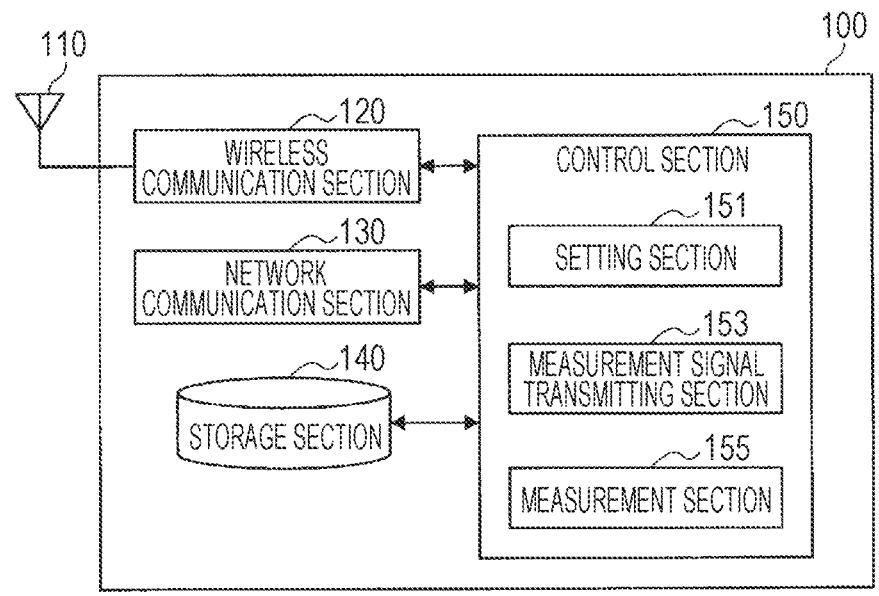
FIG. 7 is a block diagram illustrating an example of a configuration of a base station according to the present embodiment.

FIG. 7 is a block diagram illustrating an example of a configuration of the base station 100 according to the present embodiment. Referring to FIG. 7, the base station 100 includes an antenna section 110, a wireless communication section 120, a network communication section 130, a storage section 140, and a control section 150.

(1) Antenna Section 110

The antenna section 110 radiates a signal output from the wireless communication section 120 as radio waves in the air. Furthermore, the antenna section 110 converts radio waves in the air into a signal and outputs the signal to the wireless communication section 120.

In particular, in the present embodiment, the antenna section 110 includes a plurality of antenna elements and can form a beam.

(2) Wireless Communication Section 120

The wireless communication section 120 transmits and receives a signal. For example, the wireless communication section 120 transmits a downlink signal to a terminal device and receives an uplink signal from a terminal device.

In particular, in the present embodiment, the wireless communication section 120 can perform communication with a terminal device by using a plurality of beams formed by the antenna section 110.

Here, in the present embodiment, the antenna section 110 and the wireless communication section 120 include a plurality of antenna panels 70 of the hybrid analogue-digital antenna architecture described above with reference to FIG. 6. For example, the antenna section 110 corresponds to the antenna 72. Further, for example, the wireless communication section 120 corresponds to the digital circuit 50, the analogue circuit 60, and the phase shifter 71.

(3) Network Communication Section 130

The network communication section 130 transmits and receives information. For example, the network communication section 130 transmits information to another node and receives information from another node. Examples of the another node described above include other base stations and core network nodes.

(4) Storage Section 140

The storage section 140 temporarily or permanently stores a program for the operation of the base station 100 and various data.

(5) Control Section 150

The control section 150 controls the entire operation of the base station 100 to provide various functions of the base station 100. The control section 150 includes a setting section 151, a measurement signal transmitting section 153, and a measurement section 155.

Setting Section 151

The setting section 151 has a function of performing setting related to communication with the terminal device 200. For example, the setting section 151 performs resource setting with respect to the terminal device 200.

The setting section 151 allocates, to the terminal device 200, a resource set for receiving a measurement signal that is beam-sweeping transmitted in downlink. The resource set is allocated to each of the plurality of antenna panels 70 included in the terminal device 200. The resource set includes, for example, as many resources used for transmission of a measurement signal using one Tx beam of the base station 100 as Tx beams.

The setting section 151 allocates, to the terminal device 200, a resource set for beam-sweeping transmission of a measurement signal in uplink. The resource set is allocated to each of the plurality of antenna panels 70 included in the terminal device 200. The resource set includes, for example, as many resources used for transmission of a measurement signal using one Tx beam of the terminal device 200 as Tx beams.

Measurement Signal Transmitting Section 153

The measurement signal transmitting section 153 has a function of transmitting a measurement signal in downlink. Specifically, the measurement signal transmitting section 153 performs beam-sweeping transmission of a measurement signal in a resource set set by the setting section 151.

Measurement Section 155

The measurement section 155 has a function of measuring an uplink measurement signal that is transmitted from the terminal device 200 and performing various processing on the basis of a measurement result. For example, the measurement section 155 measures a measurement signal that is beam-sweeping transmitted from the terminal device 200 as described above with reference to FIG. 5, and selects an optimal Tx beam of the terminal device 200 and an optimal Rx beam of the base station 100. Further, the measurement section 155 measures a measurement signal that is transmitted from the terminal device 200 by using the optimal Tx beam and acquires uplink channel quality as described above with reference to FIG. 5. Further, the measurement section 155 acquires downlink channel quality on the basis of the acquired uplink channel quality.

The control section 150 can further include other constituent elements other than these constituent elements. That is, the control section 150 can perform operations other than the operations of these constituent elements.

<2.2. Example of Configuration of Terminal Device>

Figure 8:
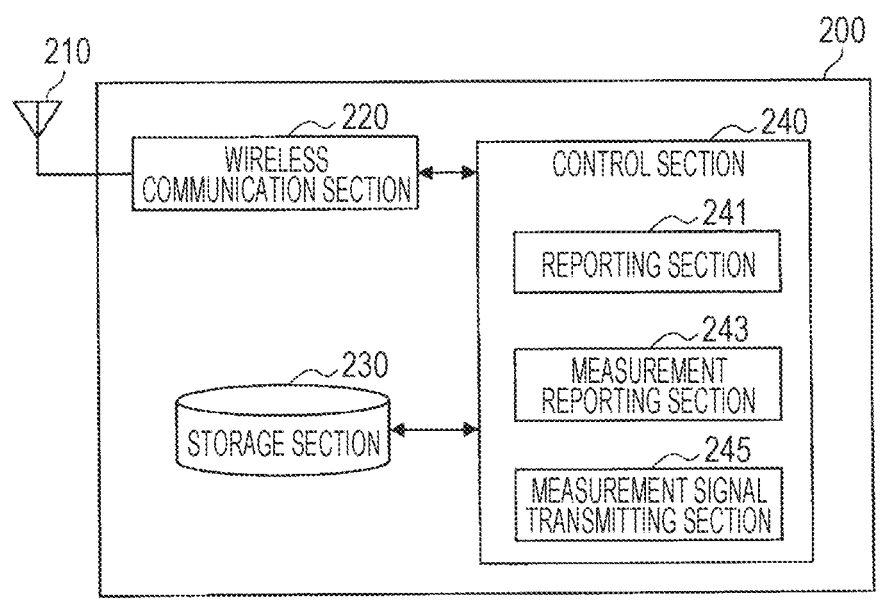
FIG. 8 is a block diagram illustrating an example of a configuration of a terminal device according to the present embodiment.

FIG. 8 is a block diagram illustrating an example of a configuration of the terminal device 200 according to the present embodiment. Referring to FIG. 8, the terminal device 200 includes an antenna section 210, a wireless communication section 220, a storage section 230, and a control section 240.

(1) Antenna Section 210

The antenna section 210 radiates a signal output from the wireless communication section 220 as radio waves in the air. Furthermore, the antenna section 210 converts radio waves in the air into a signal and outputs the signal to the wireless communication section 220.

In particular, in the present embodiment, the antenna section 210 includes a plurality of antenna elements and can form a beam.

(2) Wireless Communication Section 220

The wireless communication section 220 transmits and receives a signal. For example, the wireless communication section 220 receives a downlink signal from a base station and transmits an uplink signal to a base station.

In particular, in the present embodiment, the wireless communication section 220 can perform communication with a base station by using a plurality of beams formed by the antenna section 210.

Here, in the present embodiment, the antenna section 210 and the wireless communication section 220 include a plurality of antenna panels 70 of the hybrid analogue-digital antenna architecture described above with reference to FIG. 6. For example, the antenna section 210 corresponds to the antenna 72. Further, for example, the wireless communication section 220 corresponds to the digital circuit 50, the analogue circuit 60, and the phase shifter 71.

(3) Storage Section 230

The storage section 230 temporarily or permanently stores a program for the operation of the terminal device 200 and various data.

(4) Control Section 240

The control section 240 controls the entire operation of the terminal device 200 to provide various functions of the terminal device 200. The control section 240 includes a reporting section 241, a measurement reporting section 243, and a measurement signal transmitting section 245.

Reporting Section 241

The reporting section 241 has a function of reporting, to the base station 100, information regarding the plurality of antenna panels 70 included in the terminal device 200. Specifically, the reporting section 241 reports, to the base station 100, report information regarding the number of beams that can be transmitted or received in the same time resource on the basis of configurations of the plurality of antenna panels 70 included in the terminal device 200. For example, the reporting section 241 reports, to the base station 100, capability information as described later, antenna panel configuration information, and information indicating that measurement of a measurement signal that is beam-sweeping transmitted is abandoned.

Measurement Reporting Section 243

The measurement reporting section 243 has a function of measuring a measurement signal transmitted from the base station 100 and reporting a measurement result to the base station 100. Specifically, the measurement reporting section 243 measures a measurement signal that is beam-sweeping transmitted by the base station 100 in the resource set allocated by the base station 100, and reports a measurement result to the base station 100.

Measurement Signal Transmitting Section 245

The measurement signal transmitting section 245 has a function of transmitting a measurement signal in uplink. Specifically, the measurement signal transmitting section 245 performs beam-sweeping transmission of a measurement signal in the resource set allocated by the base station 100.

The control section 240 can further include other constituent elements other than these constituent elements. That is, the control section 240 can perform operations other than the operations of these constituent elements.

3. First Embodiment

In the present embodiment, in a case where the base station 100 performs beam-sweeping transmission of a measurement signal and the terminal device 200 performs measurement, the terminal device 200 reports, to the base station 100, information used to enable appropriate resource setting.

<3.1. Technical Problem>

The base station 100 can perform beam-sweeping transmission of a measurement signal by using a plurality of antenna panels 70 and using a plurality of different frequency resources in the same time resource. On the other hand, the terminal device 200 may also be able to receive and measure a plurality of measurement signals in the same time resource. In other words, the terminal device 200 may be able to use different frequency resources in the same time resource. However, in a case where the number of frequency resources that the terminal device 200 can use in the same time resource is unknown, it is difficult for the base station 100 to perform beam-sweeping transmission of a measurement signal by using a plurality of different frequency resources in the same time resource. Therefore, it is desirable that the number of frequency resources that the terminal device 200 can use in the same time resource is reported to the base station 100.

Further, a plurality of base stations 100 can perform beam-sweeping transmission of a measurement signal in different directions with respect to the terminal device 200. A measurement result therefor is used, for example, for determining one or more base stations 100 that transmit user data to the terminal device 200 among the plurality of base stations 100 that are transmission sources. Examples of such a base station 100 include a small base station that provides a wireless communication service in a small-sized cell such as a small cell, a pico cell, or the like. The use of the small base station is recommended in terms of traffic offloading. For example, the plurality of base stations 100 perform beam sweeping for a measurement signal by using resource sets with different frequency resources for the same time resource, respectively. As a result, the terminal device 200 can separately receive and measure each measurement signal even in a case where a plurality of measurement signals arrive at the same antenna panel 70. However, an arrival direction in which a beam is receivable by the terminal device 200 depends on the arrangement of the antenna panel 70. For example, it may be difficult for an antenna panel 70 to receive a beam arriving from behind a surface of a housing of the terminal device 200 on which the antenna panel 70 is provided. Therefore, there is a possibility that a base station 100, which is located in a direction in which it is difficult for the terminal device 200 to perform reception, may uselessly perform beam-sweeping transmission of a measurement signal. Therefore, it is desirable that a direction in which a beam is receivable by the terminal device 200 is reported to the base station 100.

<3.2. Technical Features>

The terminal device 200 (for example, the reporting section 241) according to the present embodiment reports, to the base station 100, the report information on the basis of the configurations of the plurality of antenna panels 70 included in the terminal device 200. The report information according to the present embodiment includes at least one of the capability information or the antenna panel configuration information. These information will be described in detail below.

(1) Reporting of Capability Information and Resource Setting According Thereto

Capability Information

The terminal device 200 (for example, the reporting section 241) reports, to the base station 100, capability information regarding beam reception as the report information.

The capability information includes information indicating the number of beams that can be received using a plurality of frequency resources in the same time resource. In other words, the capability information includes information indicating the number of frequency resources on which reception of a measurement signal that is beam-sweeping transmitted using the same time resource can be performed. It can also be said that the number of frequency resources is the number of resources or resource sets that can be received in the same time resource. The capability information may include the number of different resources of frequency resources that can be received in the same time resource, or may include the number of different resource sets of frequency resources that can be received in the same time resource. In terms of reducing reporting complexity, it is desirable that the capability information includes the number of different resource sets of frequency resources that can be received in the same time resource. Note that different resources or resource sets of frequency resources that can be received in the same time resource are, for example, resources or resource sets of different frequency bands within the same BWP or CC.

Here, the number of different resources or resource sets of frequency resources that can be received in the same time resource can depend on the number of antenna panels 70. This is because it is possible to transmit a signal using a different frequency resource for each antenna panel 70.

The capability information may further include the number of resource sets that is handleable by the terminal device 200. The handleable resource set is, for example, the maximum number of resource sets that the terminal device 200 can receive in a predetermined time.

Figure 9:
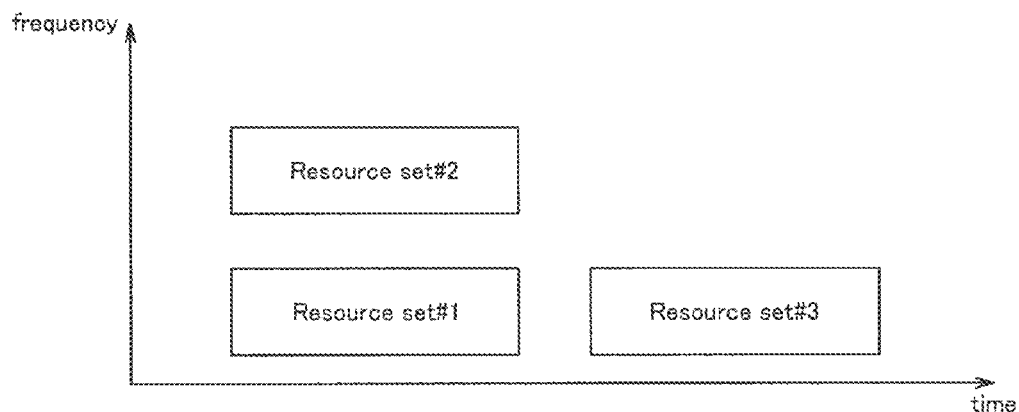
FIG. 9 is a diagram for describing an example of reporting of capability information and setting of a resource set according to a first embodiment.

FIG. 9 is a diagram for describing an example of reporting of capability information and setting of a resource set according to the present embodiment. FIG. 9 illustrates an example of resource setting in a case where the terminal device 200 reports, to the base station 100, the capability information indicating that three resource sets can be handled and two of the three resource sets can be received in the same time resource. As illustrated in FIG. 9, a total of three resource sets #1 to #3 are allocated, and time resources for two resource sets #1 and #2 are the same as each other.

Resource Setting

The base station 100 (for example, the setting section 151) performs resource setting with respect to the terminal device 200 on the basis of the capability information reported from the terminal device 200. For example, the base station 100 allocates a plurality of resource sets with different frequency resources in the same time resource on the basis of the capability information. As a result, the base station 100 (for example, the measurement signal transmitting section 153) can perform beam-sweeping transmission of a measurement signal by using a plurality of antenna panels 70 and using a plurality of different frequency resources in the same time resource.

Processing Flow

Figure 10:
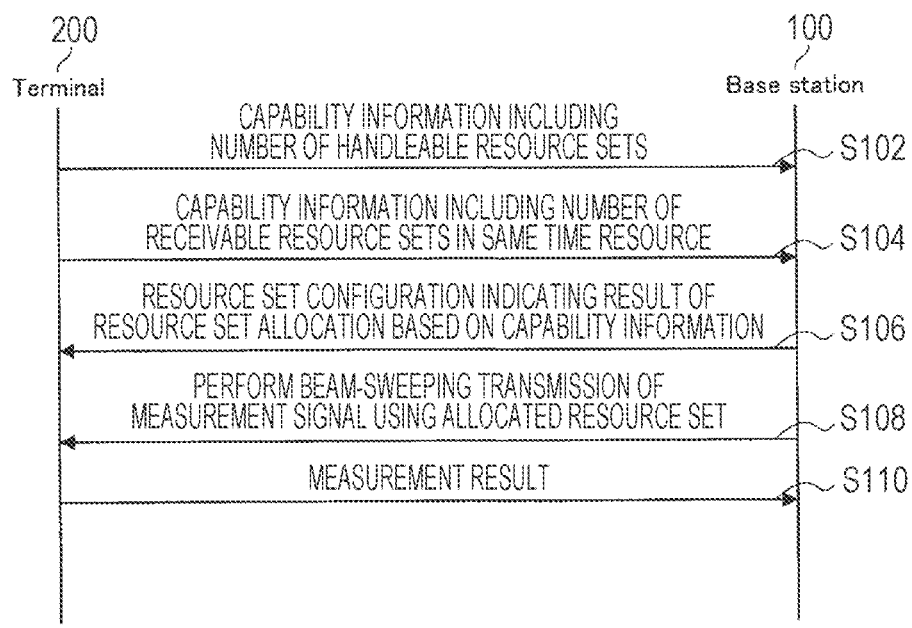
FIG. 10 is a sequence diagram illustrating an example of a flow of a beam selection procedure accompanied by beam sweeping performed in a system according to the embodiment.

FIG. 10 is a sequence diagram illustrating an example of a flow of a beam selection procedure accompanied by beam sweeping performed in the system 1 according to the present embodiment. The base station 100 and the terminal device 200 are involved in this sequence.

As illustrated in FIG. 10, the terminal device 200 reports, to the base station 100, capability information including the number of handleable resource sets (Step S102). For example, the terminal device 200 reports, to the base station 100, that three resource sets can be handled. Next, the terminal device 200 reports, to the base station 100, capability information including the number of resource sets that are receivable in the same time resource (Step S104). For example, the terminal device 200 reports, to the base station 100, that two resource sets can be received in the same time resource.

Next, the base station 100 allocates resource sets for beam sweeping on the basis of the capability information reported from the terminal device 200, and notifies the terminal device 200 of a resource set configuration indicating a result of the allocation (Step S106). For example, the base station 100 allocates the resource sets illustrated in FIG. 9 to the terminal device 200, and notifies the terminal device 200 of a result of the allocation. Next, the base station 100 performs beam-sweeping transmission of a measurement signal by using the resource sets allocated to the terminal device 200 (Step S108). For example, in a case where the resource sets illustrated in FIG. 9 are allocated to the terminal device 200, the base station 100 performs beam-sweeping transmission of a measurement signal by using each of the resource sets #1 to #3. Next, the terminal device 200 measures a measurement signal that is beam-sweeping transmitted, and reports a measurement result to the base station 100 (Step S110).

(2) Reporting of Antenna Panel Configuration Information and Resource Setting According Thereto Antenna Panel Configuration Information The terminal device 200 (for example, the reporting section 241) reports, to the base station 100, the antenna panel configuration information, which is information indicating the configurations of the plurality of antenna panels 70 included in the terminal device 200, as the report information.

The antenna panel configuration information includes information indicating the arrangement of each of the plurality of antenna panels 70 included in the terminal device 200. The information indicating the arrangement of the antenna panels 70 is information regarding a location and/or a posture (that is, a direction in which the antenna panel 70 is arranged) at which the antenna panel 70 is arranged in the housing of the terminal device 200. Hereinafter, the antenna panel configuration information will be specifically described with reference to FIG. 11.

Figure 11:
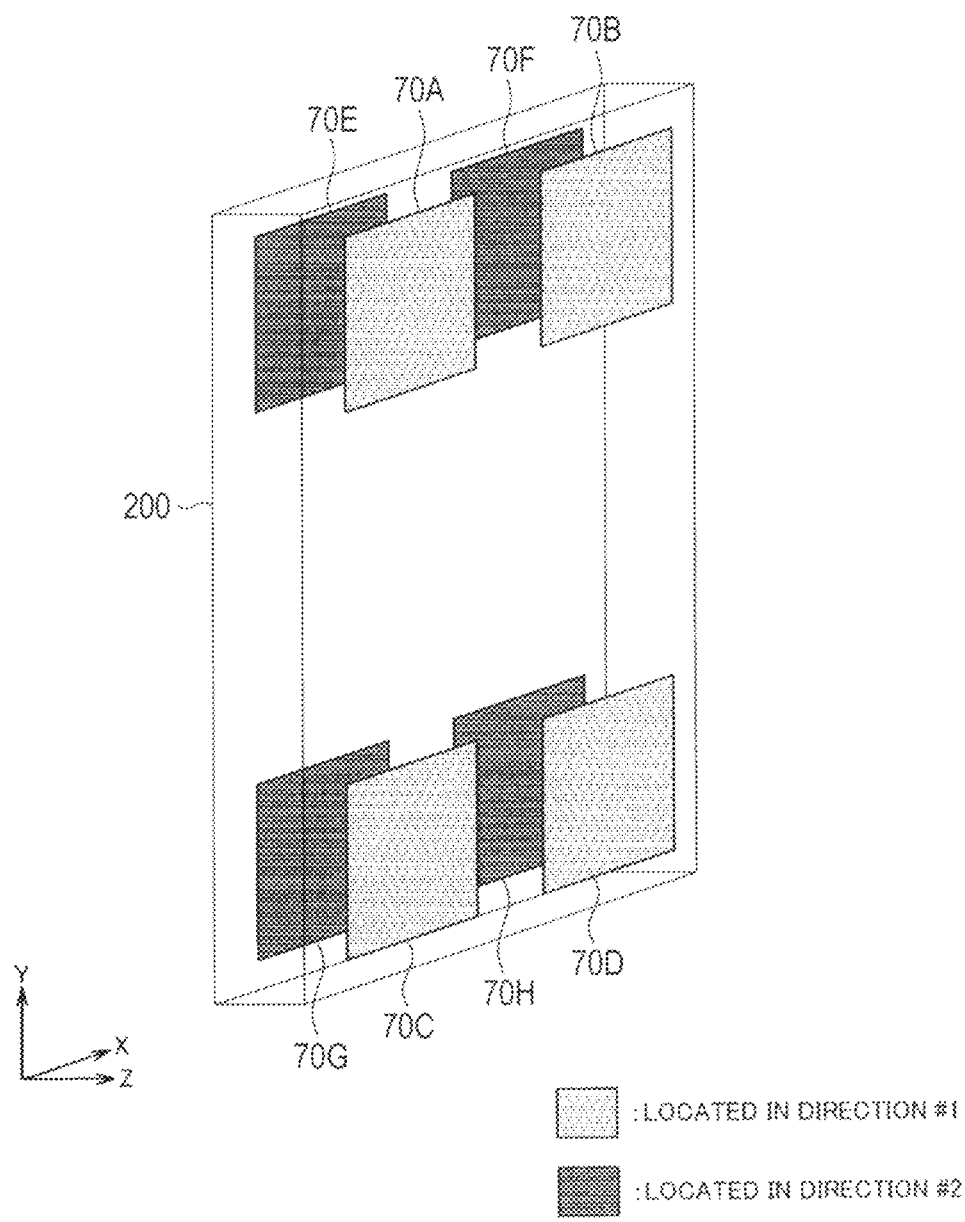
FIG. 11 is a diagram illustrating an example of arrangement of a plurality of antenna panels included in the terminal device according to the embodiment.

FIG. 11 is a diagram illustrating an example of arrangement of the plurality of antenna panels 70 included in the terminal device 200 according to the present embodiment. In FIG. 11, a screen and the like are omitted, and a schematic shape of the terminal device 200 and the arrangement of the antenna panels 70 are illustrated. In FIG. 11, an X-axis direction is a short-side direction of a surface on which the screen of the terminal device 200 is provided (a surface having the largest area), a Y-axis direction is a long-side direction of the surface on which the screen of the terminal device 200 is provided, and a Z-axis direction is a thickness direction of the terminal device 200. As illustrated in FIG. 11, the terminal device 200 includes eight antenna panels 70, antenna panels 70A to 70H. Further, the antenna panels 70A to 70D are arranged on a positive Z-axis direction side (direction #1) of the terminal device 200, and the antenna panels 70E to 70H are arranged on a negative Z-axis direction side (direction #2) of the terminal device 200.

The antenna panel configuration information can include information indicating the number of antenna panels 70 of which arrival directions in which a beam is receivable overlap each other (for example, the same or substantially the same) among the plurality of antenna panels 70 included in the terminal device 200. Moreover, the antenna panel configuration information may include the number of antenna panels 70 of which arrival directions in which a beam is receivable overlap each other, for each overlapping arrival direction in which a beam is receivable. The antenna panels 70 of which arrival directions in which a beam is receivable overlap each other are, for example, antenna panels 70 arranged in the same direction. That is, the antenna panel configuration information may include information indicating the number of antenna panels 70 of which arrangement directions overlap each other (for example, the same or substantially the same) among the plurality of antenna panels 70 included in the terminal device 200. Note that a direction in which the antenna panel 70 is arranged is, for example, a surface on which the antenna panel 70 is arranged among the surfaces of the terminal device 200. In the example illustrated in FIG. 11, the antenna panel configuration information includes information indicating that each of four antenna panels 70 including the antenna panels 70A to 70D and four antenna panels 70 including the antenna panels 70E to 70H have overlapping arrival directions in which a beam is receivable. As the antenna panel configuration information includes such information, the base station 100 can grasp the capability of the terminal device 200 to receive beams arriving in the same direction.

The antenna panel configuration information can include information indicating the number of groups of antenna panels 70 of which arrival directions in which a beam is receivable are different from each other among the plurality of antenna panels 70 included in the terminal device 200. The groups of the antenna panels 70, of which arrival directions in which a beam is receivable are different from each other, are groups each including one or more antenna panels 70 of which arrival directions in which a beam is receivable overlap each other, and are groups each of which arrival directions in which a beam is receivable are different from (for example, do not overlap with) those of another group. The antenna panels 70 of which arrival directions in which a beam is receivable are different from each other are, for example, antenna panels 70 arranged in different directions. That is, the antenna panel configuration information may include information indicating the number of groups of antenna panels 70 of which arrangement directions are different from each other among the plurality of antenna panels 70 included in the terminal device 200. In the example illustrated in FIG. 11, the antenna panel configuration information includes information indicating that two groups, a first group including the antenna panels 70A to 70D and a second group including the antenna panels 70E to 70H have different arrival directions in which a beam is receivable. As the antenna panel configuration information includes such information, the base station 100 can grasp the capability of the terminal device 200 to receive beams arriving in different directions.

By reporting these information, for example, it is possible to perform beam-sweeping transmission of a measurement signal only to a plurality of base stations 100 located in the arrival directions in which a beam is receivable by the terminal device 200. Therefore, useless beam-sweeping transmission of a measurement signal is avoided, and resource efficiency is improved.

The antenna panel configuration information may include information indicating the number of antenna panels 70 included in the terminal device 200. As a result, the base station 100 that has acquired the report information can request the terminal device 200 to report a measurement result for each antenna panel 70.

An example of the antenna panel configuration information reported by the terminal device 200 including the antenna panels 70 arranged as illustrated in FIG. 11 is shown below.

[Table 3]

TABLE 3

Example of Antenna Panel Configuration Information

| Panel ID | Arrangement Direction |
|---|---|
| 1 | 1 |
| 2 | 1 |
| 3 | 1 |
| 4 | 1 |
| 5 | 2 |

TABLE 3-continued

Example of Antenna Panel Configuration Information

| Panel ID | Arrangement Direction |
|---|---|
| 6 | 2 |
| 7 | 2 |
| 8 | 2 |

Note that a panel ID in Table 3 is identification information of the antenna panel 70, and is unique for each antenna panel 70. The number of panel IDs indicates the number of antenna panels 70 included in the antenna panel 70. Note that, in Table 3, the panel IDs of the antenna panels 70A to 70H illustrated in FIG. 11 are 1 to 8, respectively. Further, an arrangement direction in Table 3 is an index indicating a direction in which the antenna panel 70 is arranged. The antenna panels 70 to which indexes indicating the same arrangement direction are added, respectively, indicate that the antenna panels 70 face the same direction, that is, arrival directions in which a beam is receivable overlap each other. The antenna panels 70 to which indexes indicating different arrangement direction are added, respectively, indicate that the antenna panels 70 face different directions, that is, arrival directions in which a beam is receivable are different from each other.

Figure 12:
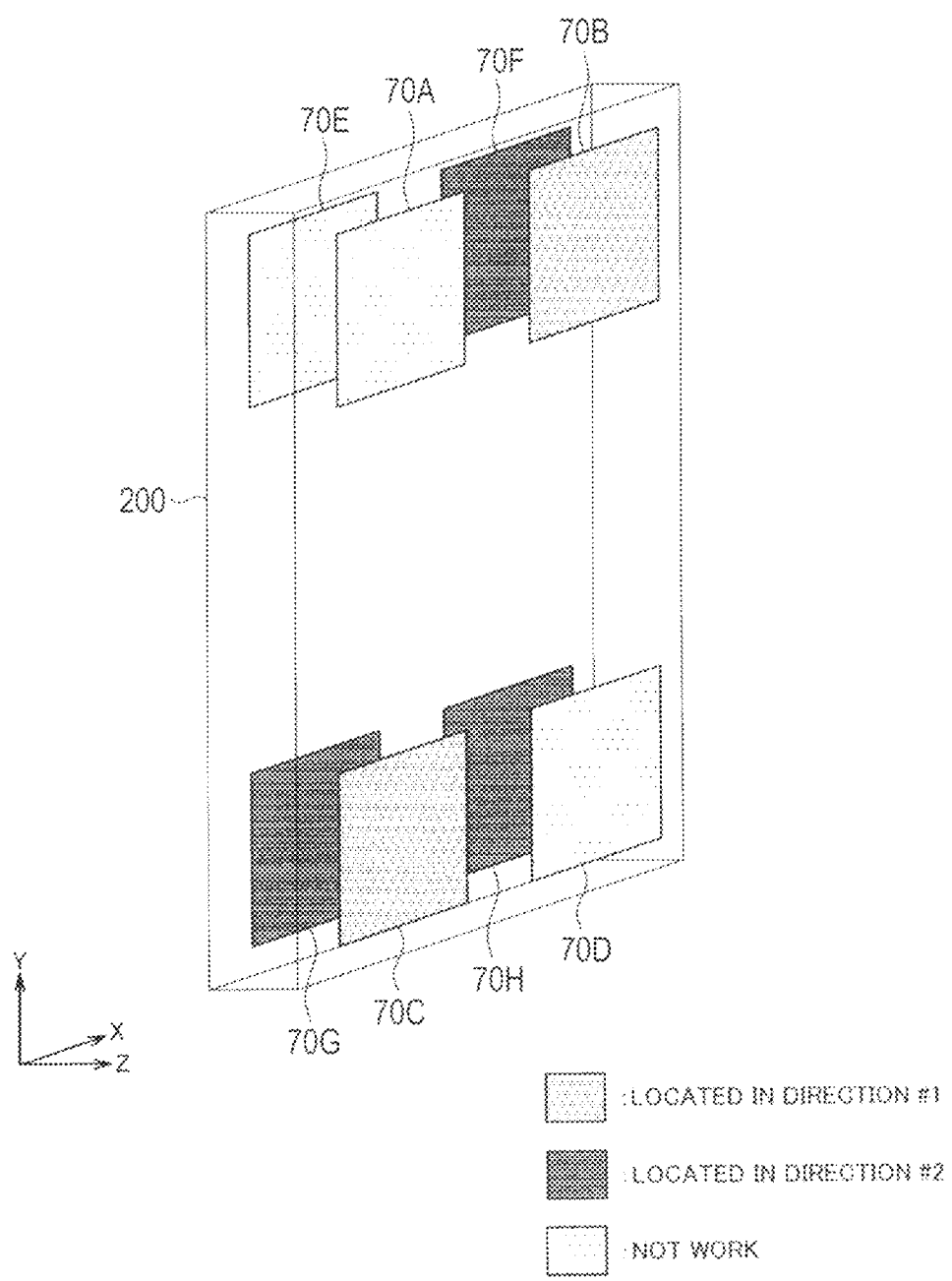
FIG. 12 is a diagram illustrating an example of antenna panels that can perform transmission and reception at the same time among the antenna panels arranged as illustrated in FIG. 11.
Figure 13:
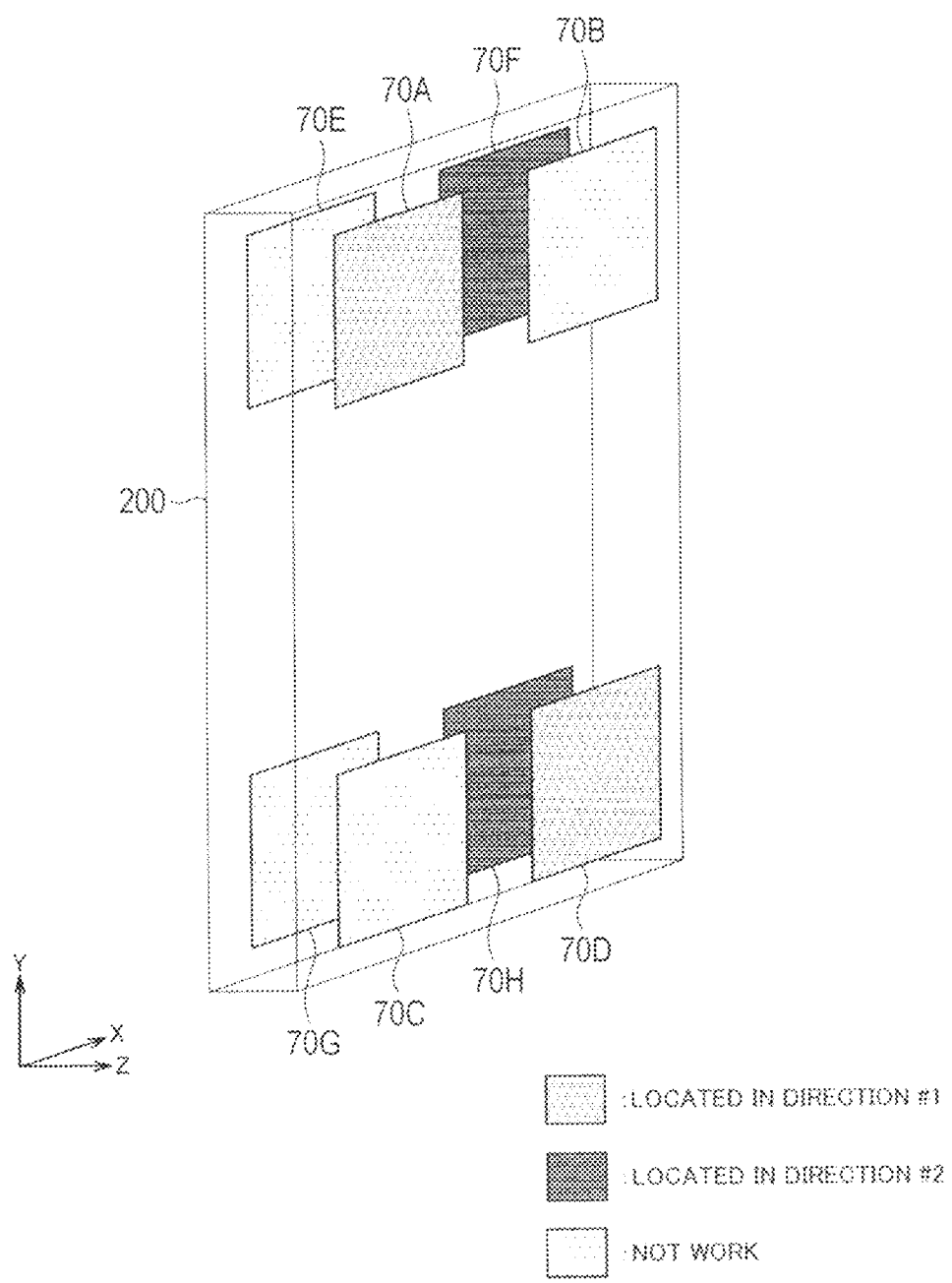
FIG. 13 is a diagram illustrating an example of antenna panels that can perform transmission and reception at the same time among the antenna panels arranged as illustrated in FIG. 11.
Figure 14:
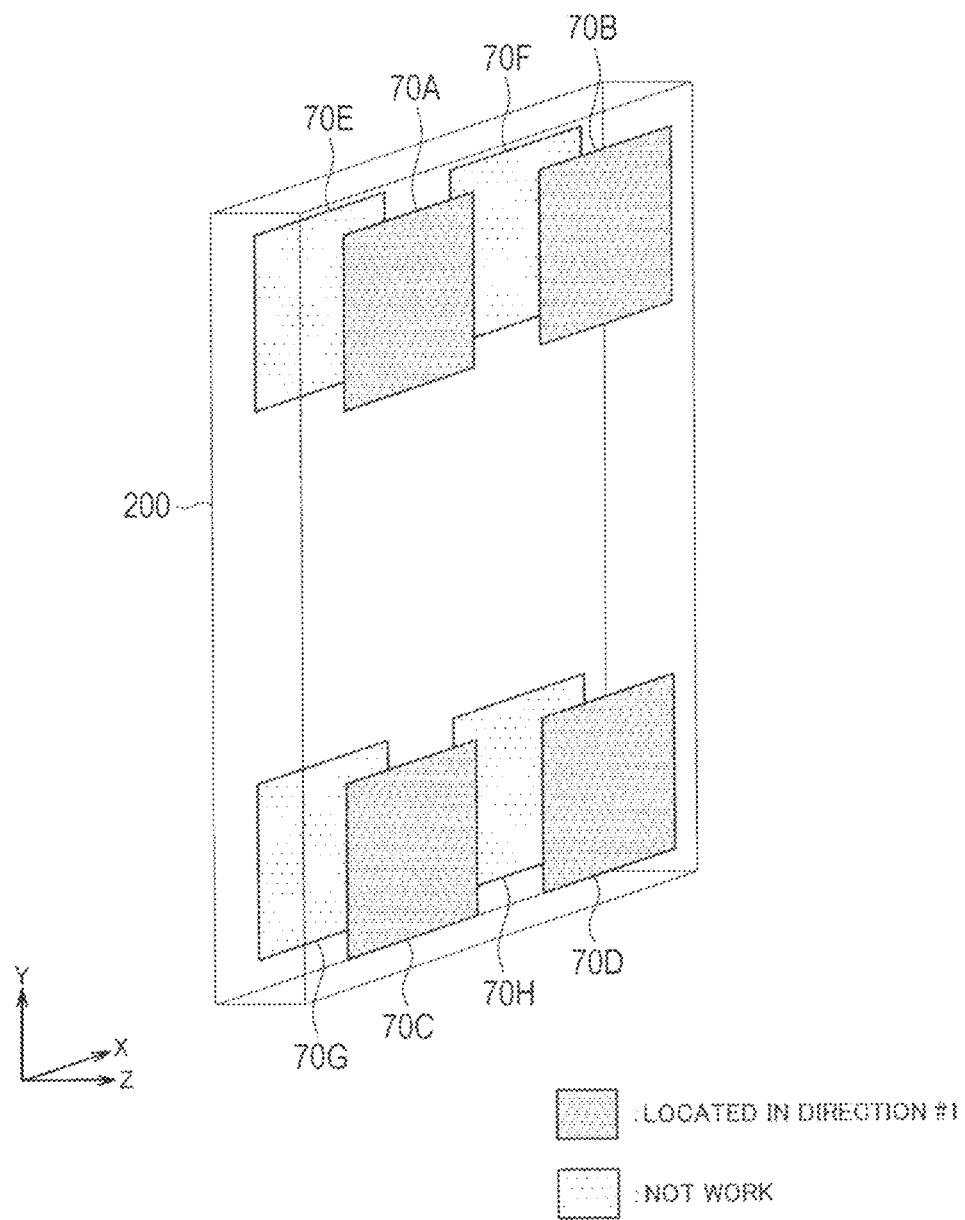
FIG. 14 is a diagram illustrating an example of antenna panels that can perform transmission and reception at the same time among the antenna panels arranged as illustrated in FIG. 11.

Moreover, the antenna panel configuration information can include information indicating the number of antenna panels 70 that can perform reception in the same time resource. This will be specifically described with reference to FIGS. 12 to 14. FIGS. 12 to 14 are each a diagram illustrating an example of antenna panels 70 that can perform transmission and reception at the same time among the antenna panels 70 arranged as illustrated in FIG. 11. In the example illustrated in FIG. 12, the antenna panels 70A, 70D, and 70E do not work and cannot perform transmission and reception at the same time as other antenna panels 70, while other antenna panels 70 can perform transmission and reception at the same time. In the example illustrated in FIG. 13, the antenna panels 70B, 70C, 70E, and 70G do not work and cannot perform transmission and reception at the same time as other antenna panels 70, while other antenna panels 70 can perform transmission and reception at the same time. In the example illustrated in FIG. 14, the antenna panels 70E to 70H do not work and cannot perform transmission and reception at the same time as other antenna panels 70, while other antenna panels 70 can perform transmission and reception at the same time.

The antenna panels 70 that can perform reception in the same time resource may be antenna panels 70 that can perform reception in the same time resource among all the antenna panels 70 included in the terminal device 200. In the example illustrated in FIG. 12, among the antenna panels 70A to 70H, five antenna panels 70 including the antenna panels 70B, 70C, 70F, 70G, and 70H can perform reception at the same time, and thus "5" is reported.

The antenna panels 70 that can perform reception in the same time resource may be antenna panels 70 that can perform reception in the same time resource among a plurality of antenna panels 70 of which arrival directions in which a beam is receivable overlap each other. In other words, the antenna panels 70 that can perform reception in the same time resource may be antenna panels 70 that can perform reception in the same time resource among a plurality of antenna panels 70 arranged in the same direction. In the example illustrated in FIG. 13, among the antenna panels 70A to 70D of which arrival directions in which a beam is receivable overlap each other, the antenna panels 70A and 70D can perform reception at the same time, and thus "2" is reported for the arrangement direction #1. Moreover, in the example illustrated in FIG. 13, among the antenna panels 70E to 70H of which arrival directions in which a beam is receivable overlap each other, the antenna panels 70F and 70H can perform reception at the same time, and thus "2" is reported for the arrangement direction #2.

The antenna panels 70 that can perform reception in the same time resource may be a group of antenna panels 70 that can perform reception in the same time resource among groups of antenna panels 70, of which arrival directions in which a beam is receivable are different from each other. In other words, the antenna panels 70 that can perform reception in the same time resource may be a group of antenna panels 70 that can perform reception in the same time resource among groups of antenna panels 70, of which arrival directions in which a beam is receivable are different from each other. In the examples illustrated in FIGS. 12 and 13, both the first group (antenna panels 70A to 70D) and the second group (antenna panels 70E to 70H) of which arrival directions in which a beam is receivable are different from each other can perform reception at the same time, and thus "2" is reported. On the other hand, in the example illustrated in FIG. 14, among the first group (antenna panels 70A to 70D) and the second group (antenna panels 70E to 70H) of which arrival directions in which a beam is receivable are different from each other, only the first group can perform reception, and thus "1" is reported.

Resource Setting

The base station 100 (for example, the setting section 151) performs resource setting with respect to the terminal device 200 on the basis of the antenna panel configuration information reported from the terminal device 200. For example, the base station 100 allocates a plurality of resource sets with different frequency resources in the same time resource on the basis of the antenna panel configuration information. In such a plurality of resource sets, a measurement signal is beam-sweeping transmitted by a plurality of small base stations located in arrival directions in which a beam is receivable by the terminal device 200.

The base station 100 sets a resource for beam sweeping performed by a plurality of base stations 100 located in the arrival directions in which a beam is receivable by the terminal device 200. In other words, the base station 100 does not set a resource for beam sweeping performed by a plurality of base stations 100 located in arrival direction in which it is difficult for the terminal device 200 to receive a beam. Therefore, useless beam-sweeping transmission of a measurement signal is avoided, and resource efficiency is improved.

Note that the plurality of small base stations that perform beam sweeping may include the base station 100 that performs resource setting, or may be different from the base station 100 that performs resource setting.

Processing Flow

Figure 15:
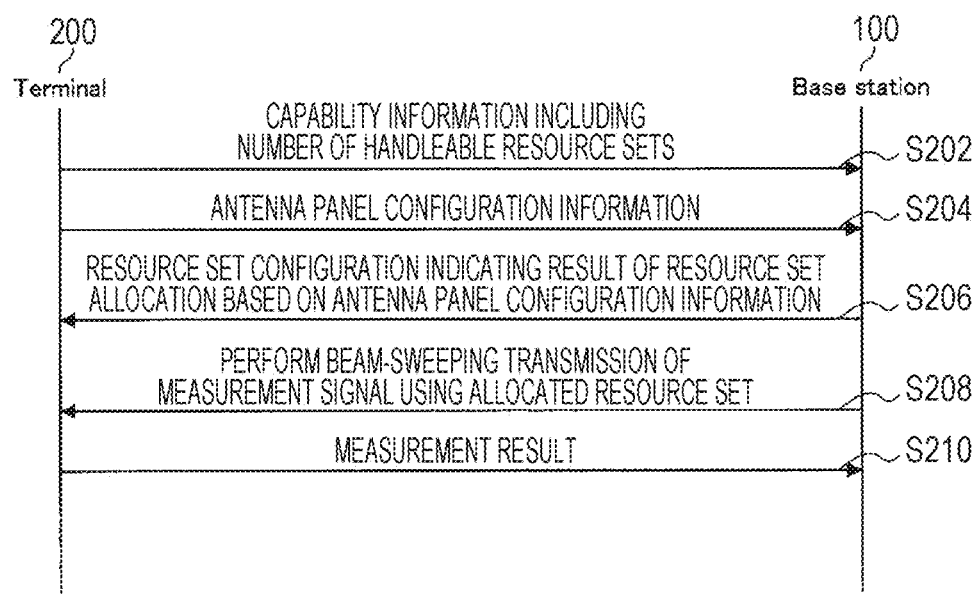
FIG. 15 is a sequence diagram illustrating an example of a flow of the beam selection procedure accompanied by beam sweeping performed in the system according to the embodiment.

FIG. 15 is a sequence diagram illustrating an example of a flow of a beam selection procedure accompanied by beam sweeping performed in the system 1 according to the present embodiment. The base station 100 and the terminal device 200 are involved in this sequence.

As illustrated in FIG. 15, the terminal device 200 reports, to the base station 100, capability information including the number of handleable resource sets (Step S202). For example, the terminal device 200 reports, to the base station 100, that eight resource sets can be handled. Next, the terminal device 200 reports the antenna panel configuration information to the base station 100 (Step S204).

Next, the base station 100 allocates resource sets for beam sweeping on the basis of the antenna panel configuration information reported from the terminal device 200, and notifies the terminal device 200 of a resource set configuration indicating a result of the allocation (Step S206). For example, the base station 100 allocates, to the terminal device 200, resource sets for reception and measurement of a measurement signal that is beam-sweeping transmitted by a plurality of small base stations (for example, including the base station 100 itself) located in arrival directions in which a beam is receivable by the terminal device 200. Next, the base station 100 performs beam-sweeping transmission of a measurement signal by using the resource sets allocated to the terminal device 200 (Step S208). For example, a plurality of small base stations including the base station 100 performs beam-sweeping transmission of a measurement signal in each resource set. Next, the terminal device 200 measures a measurement signal that is beam-sweeping transmitted, and reports a measurement result to the base station 100 (Step S210).

4. Second Embodiment

In the present embodiment, in a case where downlink beam-sweeping transmission is performed beyond the capability of the terminal device 200, information indicating that fact is reported as a measurement result. The present embodiment is particularly effective in a case where the capability information described in the first embodiment is not reported.

<4.1. Technical Problem>

Figure 16:
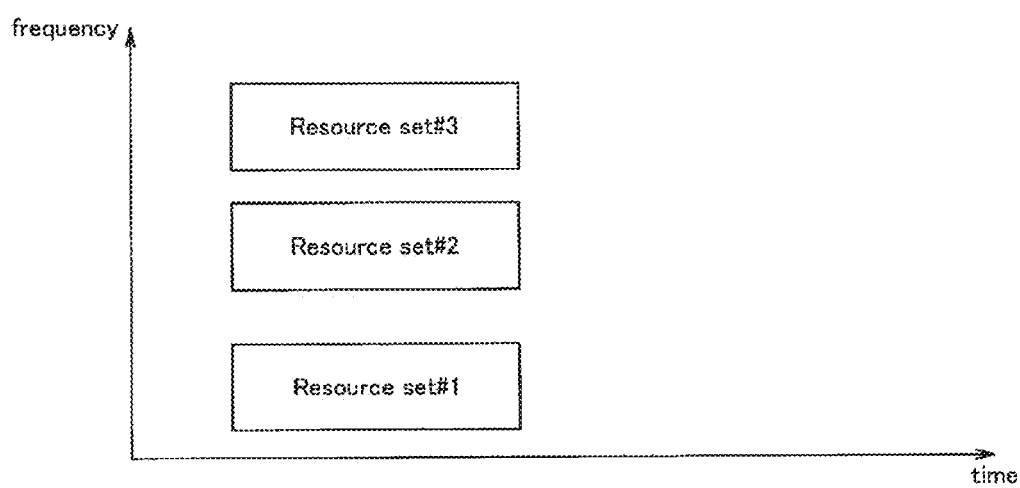
FIG. 16 is a diagram for describing a technical problem according to a second embodiment.

In some cases, the beam sweeping is performed beyond the capability of the terminal device 200. For example, the resource setting illustrated in FIG. 16 may be performed even in a case where the number of frequency resources on which the terminal device 200 can receive a measurement signal that is beam-sweeping transmitted by using the same time resource is two. FIG. 16 is a diagram for describing a technical problem according to the present embodiment. As illustrated in FIG. 16, a total of three resource sets #1 to #3 are allocated to the terminal device 200, and all the time resources are the same. The terminal device 200 can perform reception and measurement for only two of these three resource sets #1 to #3, and the remaining one resource set is not a target of the reception and measurement.

In such a case where beam sweeping is performed beyond the capability of the terminal device 200, it is desirable that information indicating that fact is reported to the base station 100.

Alternatively, a method of reporting that RSRP was very low may be considered, but in this case, such a report may be recognized by the base station 100 as having a different meaning. In addition, a method in which the reporting itself is not performed can be considered, but in this case, the base station 100 can misunderstand that reception of a measurement result in uplink has failed.

<4.2. Technical Features>

The terminal device 200 (for example, the reporting section 241) reports, to the base station 100, information indicating that measurement of a measurement signal that is beam-sweeping transmitted from the base station 100 is abandoned as the report information. For example, the report information includes a combination of the information indicating that measurement of a measurement signal that is beam-sweeping transmitted from the base station 100 is abandoned, and information indicating a beam group, a beam, a resource set, and/or a resource for which measurement is abandoned. Therefore, the base station 100 can recognize that beam sweeping is performed beyond the capability of terminal device 200 and measurement for which beam group, beam, resource set, and/or resource is abandoned. As a result, the base station 100 (for example, the setting section 151) can reset a resource set, for example.

The information indicating that measurement of a measurement signal that is beam-sweeping transmitted from the base station 100 is abandoned can be reported to the base station 100 together with a measurement result for the beam sweeping (for example, while being included in information reported as the measurement result). An example thereof is shown in Table 4.

TABLE 4

| Constituent Elements of Information Reported as Measurement Result | |
|---|---|
| Constituent Elements | Description |
| CRI | Information Indicating Which Beam Is Used To Transmit Measurement Signal Being Reported |
| RSRP | Received Power (For Example, Bit Indicating −80 dBm Etc.) |
| Ignore | Bit Indicating That Reception Processing Is Abandoned |

The information reported as the measurement result includes configuration resource identity (CRI). Further, the information reported as the measurement result includes RSRP. Further, the information reported as the measurement result includes Ignore. Ignore is a bit indicating whether or not reception processing is abandoned. For example, Ignore is 1 in a case where beam sweeping is performed beyond the capability, and Ignore is 0 otherwise.

5. Third Embodiment

In the present embodiment, in a case where the terminal device 200 performs beam-sweeping transmission of a measurement signal and the base station 100 performs measurement, the terminal device 200 reports, to the base station 100, information used by the base station 100 to perform resource setting for the beam-sweeping transmission with respect to the terminal device 200.

<5.1. Technical Problem>

The terminal device 200 can perform beam-sweeping transmission of a measurement signal by using a plurality of antenna panels 70 and using a plurality of different frequency resources in the same time resource. Moreover, the terminal device 200 may be able to perform beam-sweeping transmission of a measurement signal in a plurality of different directions depending on an installation position of each of the plurality of antenna panels 70.

It is desirable for the base station 100 to select a Tx beam of the terminal device 200 and/or an Rx beam of the base station 100 in consideration of the diversity of the direction of the Tx beam of the terminal device 200. Therefore, it is desirable that an antenna panel 70, that is a transmission source of an uplink measurement signal that is beam-sweeping transmitted, can be identified by the base station 100.

<5.2. Technical Features>
Antenna Panel Configuration Information

The terminal device 200 (for example, the reporting section 241) reports, to the base station 100, the antenna panel configuration information, which is information indicating the configurations of the plurality of antenna panels 70 included in the terminal device 200, as the report information.

The antenna panel configuration information includes information indicating the arrangement of each of the plurality of antenna panels 70 included in the terminal device 200. The information indicating the arrangement of the antenna panels 70 is information regarding a location and/or a posture (that is, a direction) at which the antenna panel 70 is arranged in the housing of the terminal device 200. Hereinafter, the antenna panel configuration information will be specifically described by referring back to FIG. 11.

The antenna panel configuration information can include information indicating the number of antenna panels 70 of which directions in which a beam is transmittable overlap each other (for example, the same or substantially the same) among the plurality of antenna panels 70 included in the terminal device 200. Moreover, the antenna panel configuration information may include the number of antenna panels 70 of which directions in which a beam is transmittable overlap each other, for each overlapping direction in which a beam is transmittable. The antenna panels 70 of which directions in which a beam is transmittable overlap each other are, for example, antenna panels 70 arranged in the same direction. That is, the antenna panel configuration information may include information indicating the number of antenna panels 70 of which arrangement directions overlap each other (for example, the same or substantially the same) among the plurality of antenna panels 70 included in the terminal device 200. A direction in which the antenna panel 70 is arranged is, for example, a surface on which the antenna panel 70 is arranged among the surfaces of the terminal device 200. In the example illustrated in FIG. 11, the antenna panel configuration information includes information indicating that each of four antenna panels 70 including the antenna panels 70A to 70D and four antenna panels 70 including the antenna panels 70E to 70H have overlapping directions in which a beam is transmittable. As the antenna panel configuration information includes such information, the base station 100 can grasp the capability of the terminal device 200 to transmit beams in the same direction.

The antenna panel configuration information can include information indicating the number of groups of antenna panels 70 of which directions in which a beam is transmittable are different from each other among the plurality of antenna panels 70 included in the terminal device 200. The groups of the antenna panels 70, of which directions in which a beam is transmittable are different from each other, are groups each including one or more antenna panels 70 of which directions in which a beam is transmittable overlap each other, and are groups each of which directions in which a beam is transmittable are different from (for example, do not overlap with) those of another group. The antenna panels 70 of which directions in which a beam is transmittable are different from each other are, for example, antenna panels 70 arranged in different directions. That is, the antenna panel configuration information may include information indicating the number of groups of antenna panels 70 of which arrangement directions are different from each other among the plurality of antenna panels 70 included in the terminal device 200. In the example illustrated in FIG. 11, the antenna panel configuration information includes information indicating that two groups, a first group including the antenna panels 70A to 70D and a second group including the antenna panels 70E to 70H have different directions in which a beam is transmittable. As the antenna panel configuration information includes such information, the base station 100 can grasp the capability of the terminal device 200 to transmit beams in different directions.

The antenna panel configuration information may include information indicating the number of antenna panels 70 included in the terminal device 200. As a result, the base station 100 that has acquired the report information can request beam-sweeping transmission of a measurement signal by each antenna panel 70.

An example of the antenna panel configuration information reported by the terminal device 200 including the antenna panels 70 arranged as illustrated in FIG. 11 is shown below.

TABLE 5

Example of Antenna Panel Configuration Information

| Panel ID | Arrangement Direction |
|---|---|
| 1 | 1 |
| 2 | 1 |
| 3 | 1 |
| 4 | 1 |
| 5 | 2 |
| 6 | 2 |
| 7 | 2 |
| 8 | 2 |

Note that a panel ID in Table 5 is identification information of the antenna panel 70, and is unique for each antenna panel 70. The number of panel IDs indicates the number of antenna panels 70 included in the antenna panel 70. Note that, in Table 5, the panel IDs of the antenna panels 70A to 70H illustrated in FIG. 11 are 1 to 8, respectively. Further, an arrangement direction in Table 5 is an index indicating a direction in which the antenna panel 70 is arranged. The antenna panels 70 to which indexes indicating the same arrangement direction are added, respectively, indicate that the antenna panels 70 face the same direction, that is, directions in which a beam is transmittable overlap each other. The antenna panels 70 to which indexes indicating different arrangement direction are added, respectively, indicate that the antenna panels 70 face different directions, that is, directions in which a beam is transmittable are different from each other.

Moreover, the antenna panel configuration information can include information indicating the number of antenna panels 70 that can perform transmission in the same time resource. This will be specifically described by referring back to FIGS. 12 to 14.

The antenna panels 70 that can perform transmission in the same time resource may be antenna panels 70 that can perform transmission in the same time resource among all the antenna panels 70 included in the terminal device 200. In the example illustrated in FIG. 12, among the antenna panels 70A to 70H, five antenna panels 70 including the antenna panels 70B, 70C, 70F, 70G, and 70H can perform transmission at the same time, and thus "5" is reported.

The antenna panels 70 that can perform transmission in the same time resource may be antenna panels 70 that can perform transmission in the same time resource among a plurality of antenna panels 70 of which directions in which a beam is transmittable overlap each other. In other words, the antenna panels 70 that can perform transmission in the same time resource may be antenna panels 70 that can perform transmission in the same time resource among a plurality of antenna panels 70 arranged in the same direction. In the example illustrated in FIG. 13, among the antenna panels 70A to 70D of which directions in which a beam is transmittable overlap each other, the antenna panels 70A and 70D can perform transmission at the same time, and thus "2" is reported for the arrangement direction #1. Moreover, in the example illustrated in FIG. 13, among the antenna panels 70E to 70H of which directions in which a beam is transmittable overlap each other, the antenna panels 70F and 70H can perform transmission at the same time, and thus "2" is reported for the arrangement direction #2.

The antenna panels 70 that can perform transmission in the same time resource may be a group of antenna panels 70 that can perform transmission in the same time resource among groups of antenna panels 70, of which directions in which a beam is transmittable are different from each other. In other words, the antenna panels 70 that can perform transmission in the same time resource may be a group of antenna panels 70 that can perform transmission in the same time resource among groups of antenna panels 70, of which directions in which a beam is transmittable are different from each other. In the examples illustrated in FIGS. 12 and 13, both the first group (antenna panels 70A to 70D) and the second group (antenna panels 70E to 70H) of which directions in which a beam is transmittable are different from each other can perform transmission at the same time, and thus "2" is reported. On the other hand, in the example illustrated in FIG. 14, among the first group (antenna panels 70A to 70D) and the second group (antenna panels 70E to 70H) of which directions in which a beam is transmittable are different from each other, only the first group can perform transmission, and thus "1" is reported.

Resource Setting

The base station 100 (for example, the setting section 151) performs resource setting with respect to the terminal device 200 on the basis of the antenna panel configuration information reported from the terminal device 200. For example, the base station 100 allocates a plurality of resource sets with different frequency resources in the same time resource on the basis of the antenna panel configuration information. In such a plurality of resource sets, the terminal device 200 (for example, the measurement signal transmitting section 245) performs beam-sweeping transmission of an uplink measurement signal by using the plurality of antenna panels 70.

The base station 100 allocates a resource set on which beam-sweeping transmission of an uplink measurement signal is performed to each antenna panel 70 of the terminal device 200, and notifies the terminal device 200 of a resource set configuration indicating a result of the allocation. The resource set configuration includes one or more information in which identification information of an antenna panel 70 and information indicating a resource set to be used by the antenna panel 70 for beam-sweeping transmission of an uplink measurement signal are associated with each other.

The base station 100 may preferentially allocate resource sets to antenna panels 70 of which directions in which a beam is transmittable are different from each other. Therefore, the base station 100 can preferentially receive and measure a measurement signal that is beam-sweeping transmitted from the terminal device 200 in different directions. As a result, it becomes easy for the base station 100 to select a Tx beam of the terminal device 200 and/or an Rx beam of the base station 100 in consideration of the diversity of the direction of the Tx beam of the terminal device 200.

Beam Selection

The base station 100 (for example, the measurement section 155) measures an uplink measurement signal that is beam-sweeping transmitted, and selects, on the basis of a measurement result, a Tx beam of the terminal device 200 and/or an Rx beam of the base station 100. Here, the base station 100 can identify, on the basis of a resource set, an antenna panel 70 that is a transmission source of the uplink measurement signal that is beam-sweeping transmission. Therefore, the base station 100 may select an antenna panel 70 to be used by the terminal device 200 for transmission and/or reception.

Processing Flow

Figure 17:
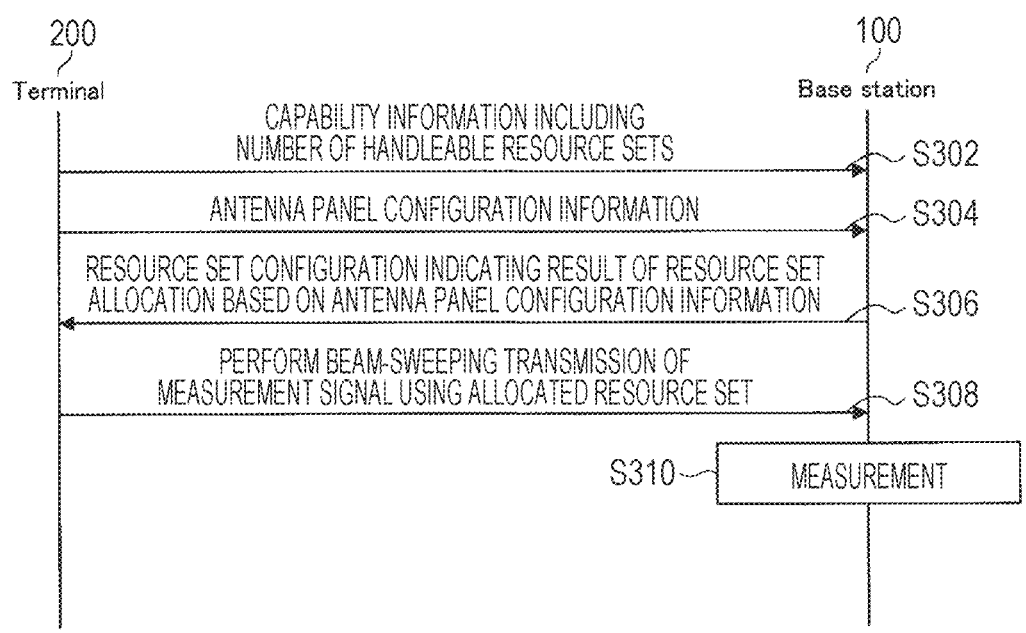
FIG. 17 is a sequence diagram illustrating an example of a flow of a beam selection procedure accompanied by beam sweeping performed in a system according to a third embodiment.

FIG. 17 is a sequence diagram illustrating an example of a flow of a beam selection procedure accompanied by beam sweeping performed in the system 1 according to the present embodiment. The base station 100 and the terminal device 200 are involved in this sequence.

As illustrated in FIG. 17, the terminal device 200 reports, to the base station 100, capability information including the number of handleable resource sets (Step S302). For example, the terminal device 200 reports, to the base station 100, that eight resource sets can be handled. Next, the terminal device 200 reports the antenna panel configuration information to the base station 100 (Step S304).

Next, the base station 100 allocates resource sets for beam sweeping on the basis of the antenna panel configuration information reported from the terminal device 200, and notifies the terminal device 200 of a resource set configuration indicating a result of the allocation (Step S306). For example, the base station 100 allocates resource sets for beam-sweeping transmission of a measurement signal in uplink to each of the antenna panels 70 that can perform transmission at the same time among the plurality of antenna panels 70 included in the terminal device 200. Next, the terminal device 200 performs beam-sweeping transmission of a measurement signal by using the resource sets allocated by the base station 100 (Step S308). Thereafter, the base station 100 performs measurement of a measurement signal that is beam-sweeping transmitted and selects a beam (Step S310).

6. Application Example

The technology according to the present disclosure can be applied to various products.

For example, the base station 100 may be realized as any kind of evolved Node B (eNB) such as a macro eNB or a small eNB. The small eNB may be an eNB that covers a cell smaller than a macrocell, such as a pico eNB, a micro eNB, or a home (femto) eNB. Alternatively, the base station 100 may be realized as another type of base station such as a NodeB or a base transceiver station (BTS). The base station 100 may include a main body (also referred to as a base station device) that controls wireless communication, and one or more remote radio heads (RRHs) that are arranged at a location different from that of the main body. Further, various types of terminals as described later may be operated as the base station 100 by temporarily or semi-permanently executing the base station function.

Further, for example, the terminal device 200 may be implemented as a smartphone, a tablet personal computer (PC), a notebook PC, a portable game terminal, a mobile terminal such as a portable/dongle type mobile router, a digital camera, or the like, or an in-vehicle terminal such as a car navigation device. Further, the terminal device 200 may be realized as a terminal (also referred to as a machine type communication (MTC) terminal) that performs machine to machine (M2M) communication. Moreover, the terminal device 200 may be a wireless communication module (for example, an integrated circuit module configured with one die) mounted on these terminals.

<6.1. Application Example Related to Base Station>

First Application Example

Figure 18:
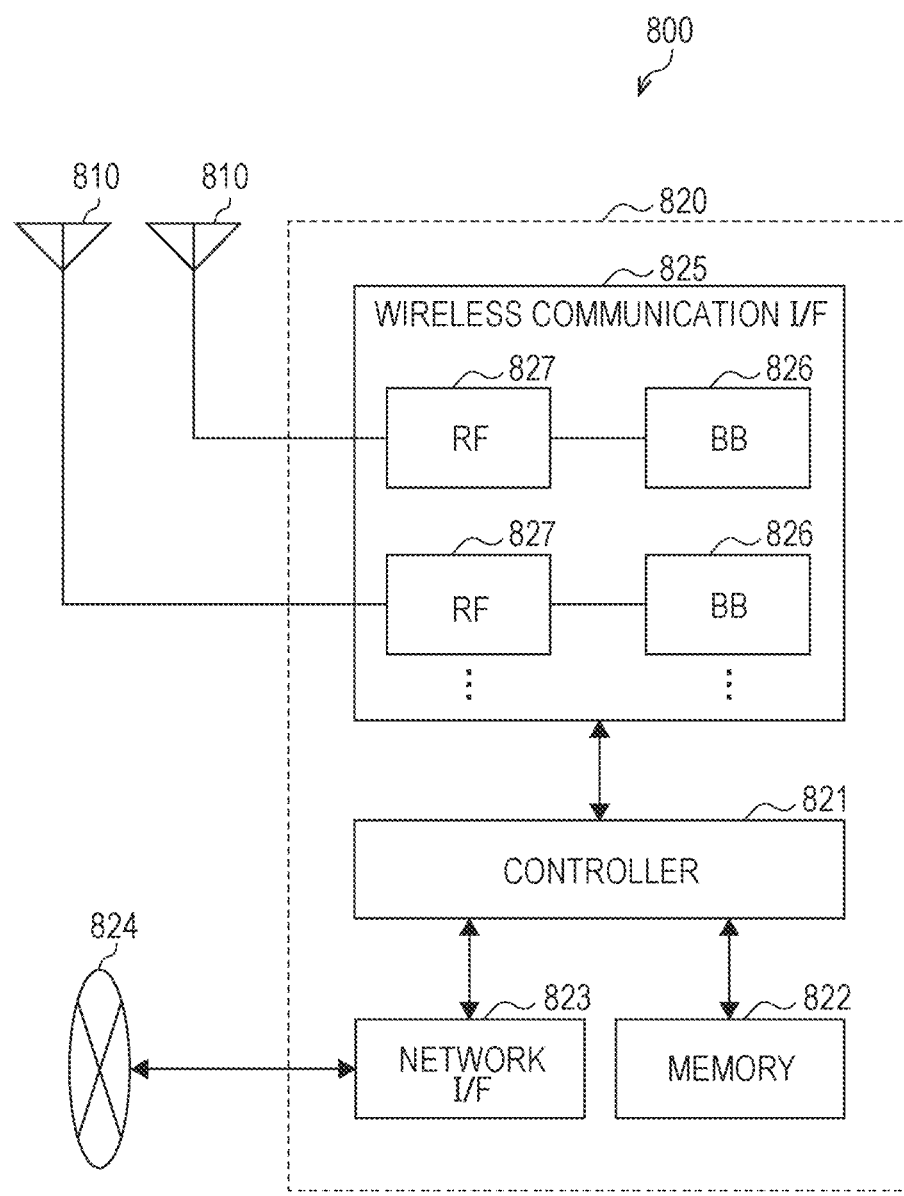
FIG. 18 is a block diagram illustrating a first example of a schematic configuration of an eNB.

FIG. 18 is a block diagram illustrating a first example of a schematic configuration of an eNB to which the technology according to the present disclosure can be applied. An eNB 800 includes one or more antennas 810 and a base station device 820. Each antenna 810 and the base station device 820 can be connected to each other via an RF cable.

Each of the antennas 810 includes a single or multiple antenna elements (for example, a plurality of antenna elements constituting a MIMO antenna) and is used for transmission and reception of a wireless signal by the base station device 820. The eNB 800 includes a plurality of antennas 810 as illustrated in FIG. 18, and the plurality of antennas 810 may correspond to, for example, a plurality of frequency bands used by the eNB 800, respectively. Note that although FIG. 18 illustrates an example in which the eNB 800 includes a plurality of antennas 810, the eNB 800 may include a single antenna 810.

The base station device 820 includes a controller 821, a memory 822, a network interface 823, and a wireless communication interface 825.

The controller 821 may be, for example, a central processing unit (CPU) or a digital signal processor (DSP), and perform a control to operate various functions of the upper layer of the base station device 820. For example, the controller 821 generates a data packet from data in a signal processed by the wireless communication interface 825 and forwards the generated packet via the network interface 823. The controller 821 may generate a bundled packet by bundling data from a plurality of baseband processors and forward the generated bundled packet. In addition, the controller 821 may have logical functions of performing a control such as a radio resource control, a radio bearer control, mobility management, an admission control, scheduling, or the like. Further, the control may be performed in cooperation with the surrounding eNB or the core network node. The memory 822 includes a random access memory (RAM) and a read only memory (ROM), and stores a program executed by the controller 821 and various control data (for example, a terminal list, transmission power data, scheduling data, and the like).

The network interface 823 is a communication interface for connecting the base station device 820 to a core network 824. The controller 821 may perform communication with a core network node or another eNB via the network interface 823. In that case, the eNB 800, and the core network node or another eNB may be connected to each other by a logical interface (for example, an S1 interface or X2 interface). The network interface 823 may be a wired communication interface or a wireless communication interface for a wireless backhaul. In a case where the network interface 823 is a wireless communication interface, the network interface 823 may use, for wireless communication, a frequency band higher than a frequency band used by the wireless communication interface 825.

The wireless communication interface 825 supports any one of cellular communication schemes such as long term evolution (LTE), LTE-Advanced, or the like, and provides wireless connection to a terminal located in a cell of the eNB 800 via the antenna 810. The wireless communication interface 825 may typically include a baseband (BB) processor 826, an RF circuit 827, and the like. The BB processor 826 may perform, for example, encoding/decoding, modulation/demodulation, multiplexing/demultiplexing, and the like, and may perform various signal processing of each layer (for example, L1, medium access control (MAC), radio link control (RLC), and packet data convergence protocol (PDCP)). Instead of the controller 821, the BB processor 826 may have some or all of the above-described logical functions. The BB processor 826 may be a module including a memory that stores a communication control program, a processor that executes the program, and a related circuit, and the functions of the BB processor 826 may be changed by updating the above-described program. Further, the above-described module may be a card or a blade to be inserted into a slot of the base station device 820, or may be a chip mounted on the card or the blade. Meanwhile, the RF circuit 827 may include a mixer, a filter, an amplifier, and the like, and transmits and receives a wireless signal via the antenna 810.

The wireless communication interface 825 includes a plurality of BB processors 826 as illustrated in FIG. 18, and the plurality of BB processors 826 may correspond to, for example, a plurality of frequency bands used by the eNB 800, respectively. Further, the wireless communication interface 825 includes a plurality of RF circuits 827 as illustrated in FIG. 18, and the plurality of RF circuits 827 may correspond to, for example, a plurality of antenna elements, respectively. Note that although FIG. 18 illustrates an example in which the wireless communication interface 825 includes a plurality of BB processors 826 and a plurality of RF circuits 827, the wireless communication interface 825 may include a single BB processor 826 or a single RF circuit 827.

In the eNB 800 illustrated in FIG. 18, one or more constituent elements (for example, the setting section 151, the measurement signal transmitting section 153, and/or the measurement section 155) included in the control section 150 described with reference to FIG. 7 may be implemented in the wireless communication interface 825. Alternatively, at least some of these constituent elements may be implemented in the controller 821. As an example, the eNB 800 may be mounted with a module including a part (for example, the BB processor 826) of or the entire wireless communication interface 825 and/or the controller 821, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the eNB 800, and the wireless communication interface 825 (for example, the BB processor 826) and/or the controller 821 may execute the program. As described above, the eNB 800, the base station device 820, or the above-described module may be provided as a device including the one or more constituent elements described above, and a program for causing a processor to function as the one or more constituent elements described above may be provided. Further, a readable recording medium on which the above-described program is recorded may be provided.

Further, in the eNB 800 illustrated in FIG. 18, the wireless communication section 120 described with reference to FIG. 7 may be implemented in the wireless communication interface 825 (for example, the RF circuit 827). Further, the antenna section 110 may be implemented in the antenna 810. Further, the network communication section 130 may be implemented in the controller 821 and/or the network interface 823. Further, the storage section 140 may be implemented in the memory 822.

Second Application Example

Figure 19:
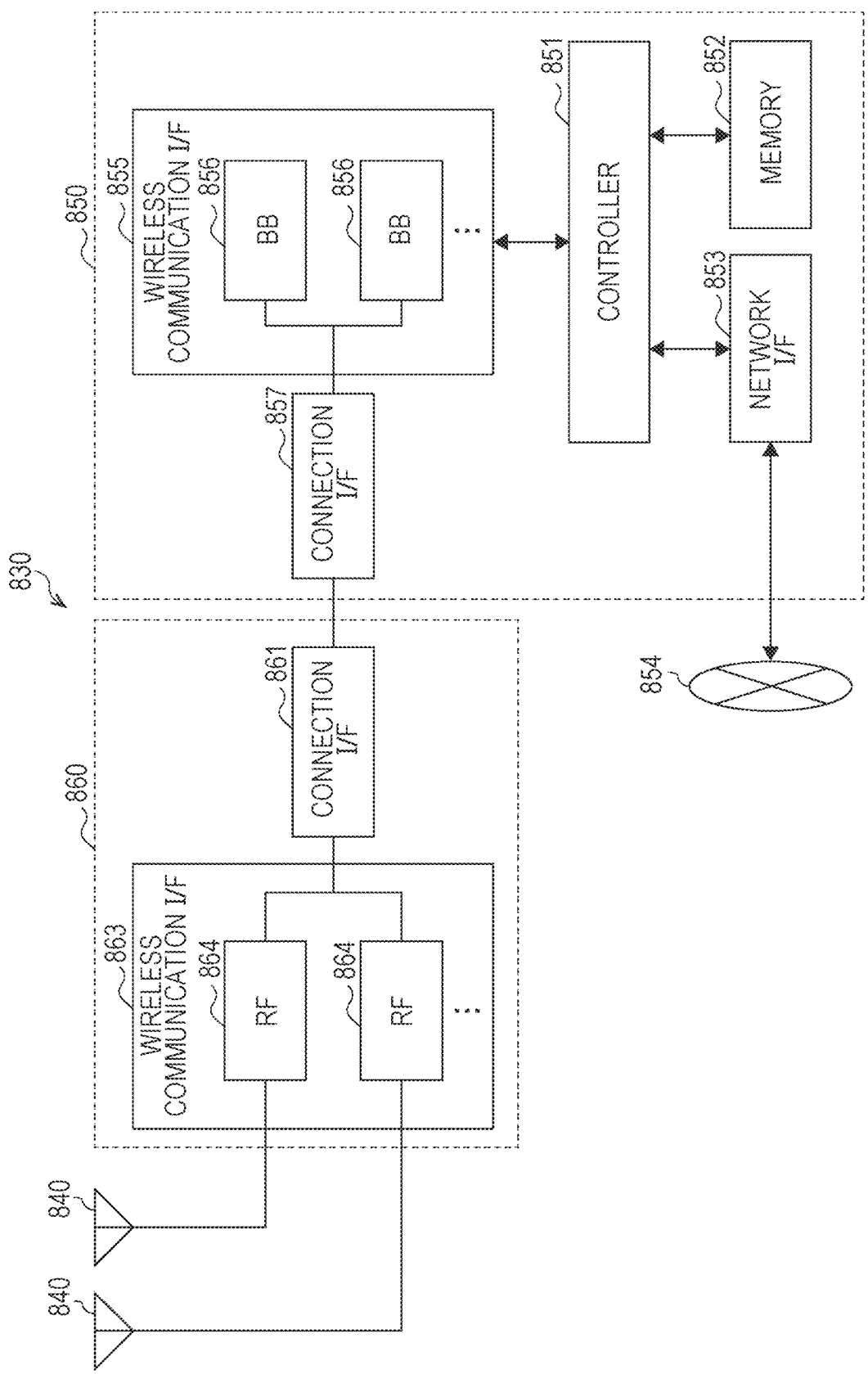
FIG. 19 is a block diagram illustrating a second example of the schematic configuration of the eNB.

FIG. 19 is a block diagram illustrating a second example of a schematic configuration of an eNB to which the technology according to the present disclosure can be applied. An eNB 830 includes one or more antennas 840, a base station device 850, and an RRH 860. Each antenna 840 and the RRH 860 may be connected to each other via an RF cable. Further, the base station device 850 and the RRH 860 can be connected to each other by a high-speed line such as an optical fiber cable.

Each of the antennas 840 includes a single or multiple antenna elements (for example, a plurality of antenna elements constituting a MIMO antenna) and is used for transmission and reception of a wireless signal by the RRH 860. The eNB 830 includes a plurality of antennas 840 as illustrated in FIG. 19, and the plurality of antennas 840 may correspond to, for example, a plurality of frequency bands used by the eNB 830, respectively. Note that although FIG. 19 illustrates an example in which the eNB 830 includes a plurality of antennas 840, the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 18.

The wireless communication interface 855 supports any one of cellular communication schemes such as LTE, LTE-Advanced, or the like, and provides wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 18, except that the BB processor 856 is connected to an RF circuit 864 of the RRH 860 via the connection interface 857. The wireless communication interface 855 includes a plurality of BB processors 856 as illustrated in FIG. 19, and the plurality of BB processors 856 may correspond to, for example, a plurality of frequency bands used by the eNB 830, respectively. Note that although FIG. 19 illustrates an example in which the wireless communication interface 855 includes a plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the above-described high-speed line connecting the base station device 850 (wireless communication interface 855) and the RRH 860 to each other.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the above-described high-speed line.

The wireless communication interface 863 transmits and receives a wireless signal via the antenna 840. The wireless communication interface 863 may typically include an RF circuit 864 and the like. The RF circuit 864 may include a mixer, a filter, an amplifier, and the like, and transmits and receives a wireless signal via the antenna 840. The wireless communication interface 863 includes a plurality of RF circuits 864 as illustrated in FIG. 19, and the plurality of RF circuits 864 may correspond to, for example, a plurality of antenna elements, respectively. Note that although FIG. 19 illustrates an example in which the wireless communication interface 863 includes a plurality of RF circuits 864, the wireless communication interface 863 may include a single RF circuit 864.

In the eNB 830 illustrated in FIG. 19, one or more constituent elements (for example, the setting section 151, the measurement signal transmitting section 153, and/or the measurement section 155) included in the control section 150 described with reference to FIG. 7 may be implemented in the wireless communication interface 855 and/or the wireless communication interface 863. Alternatively, at least some of these constituent elements may be implemented in the controller 851. As an example, the eNB 830 may be mounted with a module including a part (for example, the BB processor 856) of or the entire wireless communication interface 855 and/or the controller 851, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the eNB 830, and the wireless communication interface 855 (for example, the BB processor 856) and/or the controller 851 may execute the program. As described above, the eNB 830, the base station device 850, or the above-described module may be provided as a device including the one or more constituent elements described above, and a program for causing a processor to function as the one or more constituent elements described above may be provided. Further, a readable recording medium on which the above-described program is recorded may be provided.

Further, in the eNB 830 illustrated in FIG. 19, for example, the wireless communication section 120 described with reference to FIG. 7 may be implemented in the wireless communication interface 863 (for example, the RF circuit 864). Further, the antenna section 110 may be implemented in the antenna 840. Further, the network communication section 130 may be implemented in the controller 851 and/or the network interface 853. Further, the storage section 140 may be implemented in the memory 852.

<6.2. Application Example Related to Terminal Device>

First Application Example

Figure 20:
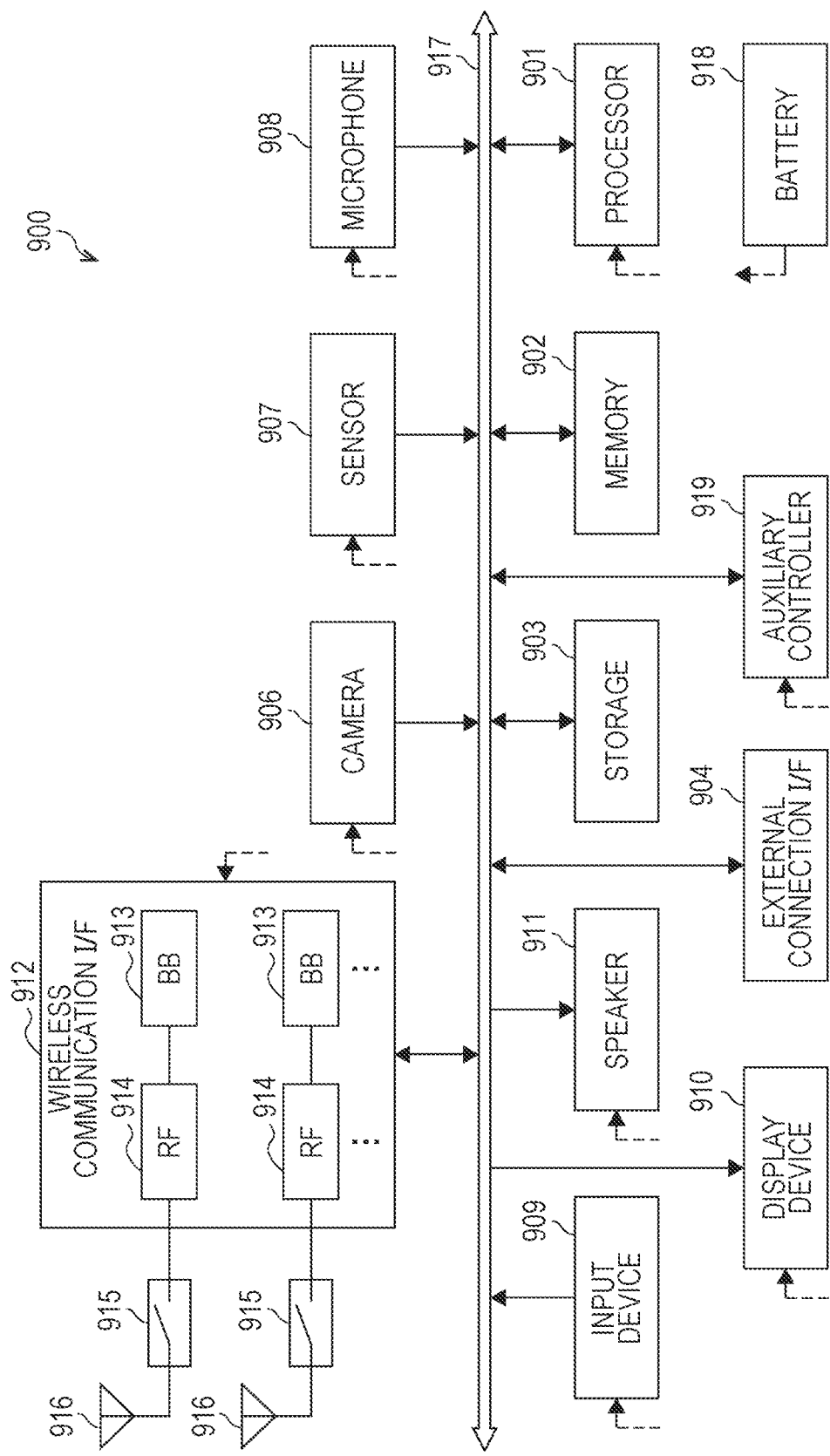
FIG. 20 is a block diagram illustrating an example of a schematic configuration of a smartphone.

FIG. 20 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM and stores a program executed by the processor 901 and data. The storage 903 can include a storage medium such as a semiconductor memory or a hard disk. The external connection interface 904 is an interface for connecting an externally attached device such as a memory card, a universal serial bus (USB) device, or the like to the smartphone 900.

The camera 906 includes, for example, an image capturing element such as a charge coupled device (CCD), a complementary metal oxide semiconductor (CMOS), or the like, and generates a captured image. The sensor 907 can include, for example, a group of sensors such as a positioning sensor, a gyro sensor, a geomagnetic sensor, an acceleration sensor, and the like. The microphone 908 converts sound input to the smartphone 900 into a sound signal. The input device 909 includes, for example, a touch sensor that detects a touch on a screen of the display device 910, a keypad, a keyboard, a button, a switch, or the like, and receives a manipulation or information input from the user. The display device 910 includes a screen such as a liquid crystal display (LCD), an organic light emitting diode (OLED) display, or the like, and displays an output image of the smartphone 900. The speaker 911 converts the sound signal output from the smartphone 900 into sound.

The wireless communication interface 912 supports any cellular communication scheme such as LTE or LTE-Advanced and performs wireless communication. The wireless communication interface 912 can typically include a BB processor 913, an RF circuit 914, and the like. The BB processor 913 may perform, for example, encoding/decoding, modulation/demodulation, multiplexing/demultiplexing, and the like, and performs various signal processing for wireless communication. Meanwhile, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 20. Note that although FIG. 20 illustrates an example in which the wireless communication interface 912 includes a plurality of BB processors 913 and a plurality of RF circuits 914, the wireless communication interface 912 may include a single BB processor 913 or a single RF circuit 914.

Moreover, the wireless communication interface 912 may support another type of wireless communication scheme such as a short-range wireless communication scheme, a near field wireless communication scheme, a wireless local area network (LAN) scheme, or the like, in addition to the cellular communication scheme. In that case, the wireless communication interface 912 may include the BB processor 913 and the RF circuit 914 for each wireless communication scheme.

Each of the antenna switches 915 switches a connection destination of the antenna 916 between a plurality of circuits (for example, circuits for different wireless communication schemes) included in the wireless communication interface 912.

Each of the antennas 916 includes a single or multiple antenna elements (for example, a plurality of antenna elements constituting a MIMO antenna) and is used for transmission and reception of a wireless signal by the wireless communication interface 912. The smartphone 900 may include a plurality of antennas 916 as illustrated in FIG. 20. Note that although FIG. 20 illustrates an example in which the smartphone 900 includes a plurality of antennas 916, the smartphone 900 may include a single antenna 916.

Moreover, the smartphone 900 may include the antenna 916 for each wireless communication scheme. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to one another. The battery 918 supplies power to each block of the smartphone 900 illustrated in FIG. 20 via a power supply line partially indicated by the broken line in FIG. 20. The auxiliary controller 919 performs control to operate minimum necessary functions of the smartphone 900, for example, in a sleep mode.

In the smartphone 900 illustrated in FIG. 20, one or more constituent elements (for example, the reporting section 241, the measurement reporting section 243, and/or the measurement signal transmitting section 245) included in the control section 240 described with reference to FIG. 8 may be implemented in the wireless communication interface 912. Alternatively, at least some of these constituent elements may be implemented in the processor 901 or the auxiliary controller 919. As an example, the smartphone 900 may be mounted with a module including a part (for example, the BB processor 913) of or the entire wireless communication interface 912, the processor 901, and/or the auxiliary controller 919, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the smartphone 900, and the wireless communication interface 912 (for example, the BB processor 913), the processor 901, and/or the auxiliary controller 919 may execute the program. As described above, the smartphone 900 or the above-described module may be provided as a device including the one or more constituent elements described above, and a program for causing a processor to function as the one or more constituent elements described above may be provided. Further, a readable recording medium on which the above-described program is recorded may be provided.

Further, in the smartphone 900 illustrated in FIG. 20, for example, the wireless communication section 220 described with reference to FIG. 8 may be implemented in the wireless communication interface 912 (for example, the RF circuit 914). Further, the antenna section 210 may be implemented in the antenna 916. Further, the storage section 230 may be implemented in the memory 902.

Second Application Example

Figure 21:
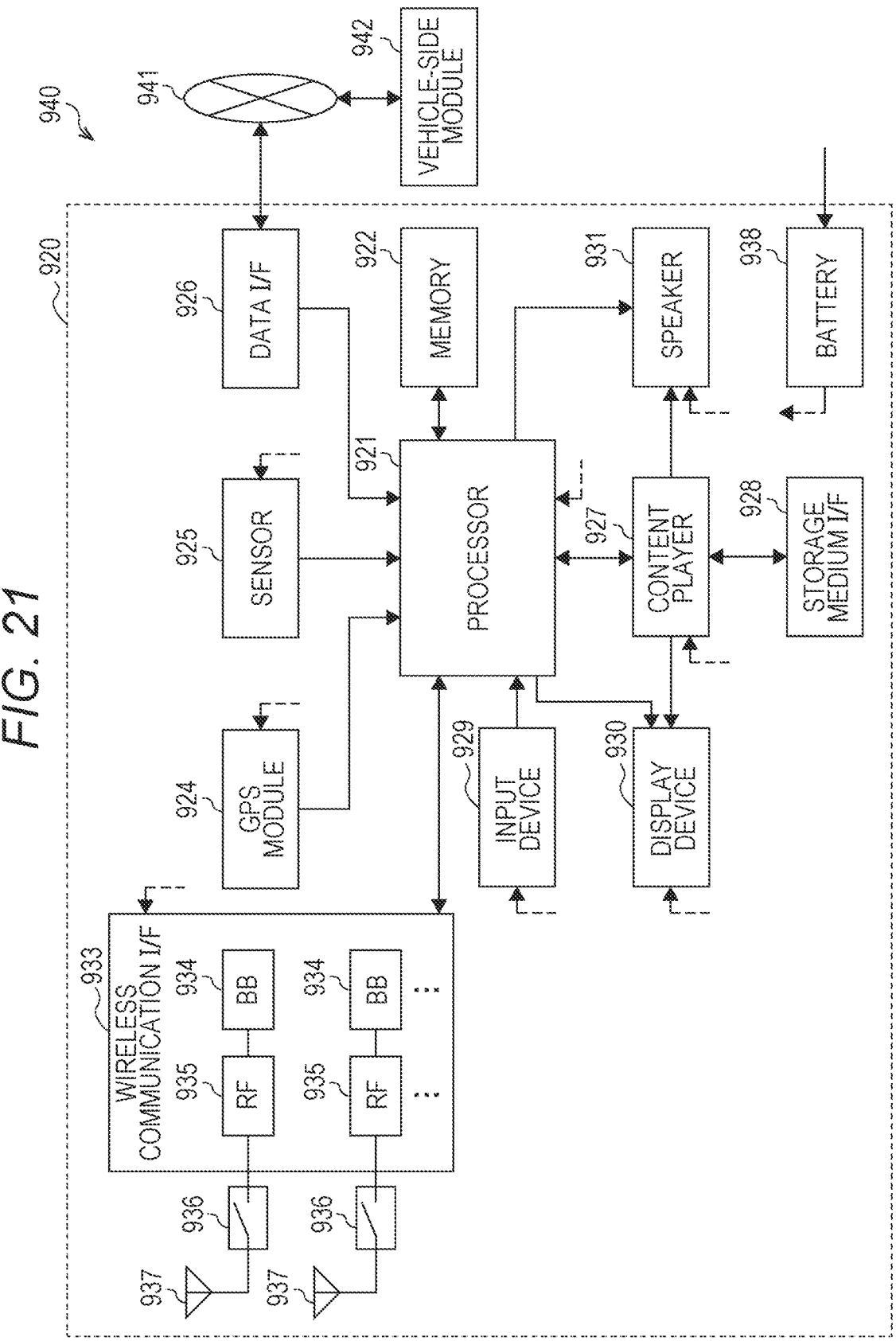
FIG. 21 is a block diagram illustrating an example of a schematic configuration of a car navigation device.

FIG. 21 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM and stores a program executed by the processor 921 and data.

The GPS module 924 uses a GPS signal received from a GPS satellite to measure a location (for example, latitude, longitude, and altitude) of the car navigation device 920. The sensor 925 can include, for example, a group of sensors such as a gyro sensor, a geomagnetic sensor, an atmospheric pressure sensor, and the like. The data interface 926 is connected to an in-vehicle network 941 via a terminal (not illustrated), for example, and acquires data generated in a vehicle side, such as vehicle speed data or the like.

The content player 927 plays a content stored in a storage medium (for example, a CD or a DVD) to be inserted into the storage medium interface 928. The input device 929 includes, for example, a touch sensor that detects a touch on a screen of the display device 930, a button, a switch, or the like, and receives a manipulation or information input from the user. The display device 930 includes a screen such as an LCD, an OLED display, or the like and displays the navigation function or an image of a content to be played. The speaker 931 outputs sound of the navigation function or a content to be played.

The wireless communication interface 933 supports any cellular communication scheme such as LTE or LTE-Advanced and performs wireless communication. The wireless communication interface 933 can typically include a BB processor 934, an RF circuit 935, and the like. The BB processor 934 may perform, for example, encoding/decoding, modulation/demodulation, multiplexing/demultiplexing, and the like, and performs various signal processing for wireless communication. Meanwhile, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 21. Note that although FIG. 21 illustrates an example in which the wireless communication interface 933 includes a plurality of BB processors 934 and a plurality of RF circuits 935, the wireless communication interface 933 may include a single BB processor 934 or a single RF circuit 935.

Moreover, the wireless communication interface 933 may support another type of wireless communication scheme such as a short-range wireless communication scheme, a near field wireless communication scheme, a wireless LAN scheme, or the like, in addition to the cellular communication scheme. In that case, the wireless communication interface 933 may include the BB processor 934 and the RF circuit 935 for each wireless communication scheme.

Each of the antenna switches 936 switches a connection destination of the antenna 937 between a plurality of circuits (for example, circuits for different wireless communication schemes) included in the wireless communication interface 933.

Each of the antennas 937 includes a single or multiple antenna elements (for example, a plurality of antenna elements constituting a MIMO antenna) and is used for transmission and reception of a wireless signal by the wireless communication interface 933. The car navigation device 920 may include a plurality of antennas 937 as illustrated in FIG. 21. Note that although FIG. 21 illustrates an example in which the car navigation device 920 includes a plurality of antennas 937, the car navigation device 920 may include a single antenna 937.

Moreover, the car navigation device 920 may include the antenna 937 for each wireless communication scheme. In that case, the antenna switch 936 may be omitted from the configuration of the car navigation device 920.

The battery 938 supplies power to each block of the car navigation device 920 illustrated in FIG. 21 via a power supply line partially indicated by the broken line in FIG. 21. In addition, the battery 938 accumulates power supplied from the vehicle side.

In the car navigation device 920 illustrated in FIG. 21, one or more constituent elements (for example, the reporting section 241 and/or the antenna control section 243) included in the control section 240 described with reference to FIG. 8 may be implemented in the wireless communication interface 933. Alternatively, at least some of these constituent elements may be implemented in the processor 921. As an example, the car navigation device 920 may be mounted with a module including a part (for example, the BB processor 934) of or the entire wireless communication interface 933 and/or the processor 921, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the car navigation device 920, and the wireless communication interface 933 (for example, the BB processor 934) and/or the processor 921 may execute the program. As described above, the car navigation device 920 or the above-described module may be provided as a device including the one or more constituent elements described above, and a program for causing a processor to function as the one or more constituent elements described above may be provided. Further, a readable recording medium on which the above-described program is recorded may be provided.

Further, in the car navigation device 920 illustrated in FIG. 21, for example, the wireless communication section 220 described with reference to FIG. 8 may be implemented in the wireless communication interface 933 (for example, the RF circuit 935). Further, the antenna section 210 may be implemented in the antenna 937. Further, the storage section 230 may be implemented in the memory 922.

Further, the technology according to the present disclosure may be realized as an in-vehicle system (or vehicle) 940 including one or more blocks of the car navigation device 920 described above, the in-vehicle network 941, and a vehicle-side module 942. The vehicle-side module 942 generates vehicle-side data such as a vehicle speed, an engine RPM, failure information, and the like and outputs the generated data to the in-vehicle network 941.

7. Conclusion

Hereinabove, an embodiment of the present disclosure has been described in detail with reference to FIGS. 1 to 21. As described above, the terminal device 200 according to the present embodiment includes a plurality of antenna panels 70 each including one or more antennas 72. Further, the terminal device 200 reports, to the base station 100, report information regarding the number of beams that can be transmitted or received in the same time resource on the basis of configurations of the plurality of antenna panels 70 included in the terminal device 200. The number of beams that can be simultaneously transmitted or received by the terminal device 200 in the same time resource depends on the configuration of the antenna panel 70 included in the terminal device 200. In this regard, the base station 100 can allocate, to the terminal device 200, resources for beam sweeping in just proportions by referring to the report information. Therefore, beam selection accompanied by beam sweeping can be efficiently performed, such that the constraint condition for setting resources used for the beam selection is reduced, and flexible resource setting becomes possible. As a result, the beam selection is speeded up, such that it is possible to suppress the interruption of communication.

Hereinabove, the preferred embodiment of the present disclosure has been described in detail with reference to the accompanying drawings, but the technical scope of the present disclosure is not limited to such examples. It is obvious that those having ordinary knowledge in the technical field of the present disclosure can conceive of various modifications or alterations within the scope of the technical idea described in the claims, and it is understood that the modifications or alterations naturally fall within the technical scope of the present disclosure.

In addition, the processing described in the present specification using the flowchart and the sequence diagram does not necessarily have to be performed in the illustrated order. Some processing steps may be performed in parallel. Further, additional processing steps may be adopted, and some processing steps may be omitted.

Furthermore, the effects described in the present specification are merely illustrative or exemplary, and not limiting. That is, the technology according to the present disclosure may achieve other effects apparent to those skilled in the art from the description of the present specification, in addition to or instead of the effects described above.

Note that the following configurations also fall within the technical scope of the present disclosure.

(1)

A communication device including:

a plurality of antenna panels that each includes one or more antennas; and a control section that reports, to a base station, report information regarding the number of beams that are transmittable or receivable in the same time resource on the basis of configurations of a plurality of the antenna panels.

(2)

The communication device according to (1), in which the report information includes antenna panel configuration information indicating the configurations of a plurality of the antenna panels.

(3)

The communication device according to (2), in which the antenna panel configuration information includes information indicating arrangement of each of a plurality of the antenna panels.

(4)

The communication device according to (3), in which the antenna panel configuration information includes information indicating the number of antenna panels of which arrival directions in which a beam is receivable overlap each other among a plurality of the antenna panels.

(5)

The communication device according to (3) or (4), in which the antenna panel configuration information includes information indicating the number of groups of the antenna panels, of which arrival directions in which a beam is receivable are different from each other among a plurality of the antenna panels.

(6)

The communication device according to any one of (3) to (5), in which the antenna panel configuration information includes information indicating the number of antenna panels that are capable of performing reception in the same time resource.

(7)

The communication device according to any one of (3) to (6), in which the antenna panel configuration information includes information indicating the number of antenna panels of which directions in which a beam is transmittable overlap each other among a plurality of the antenna panels.

(8)

The communication device according to any one of (3) to (7), in which the antenna panel configuration information includes information indicating the number of groups of the antenna panels, of which directions in which a beam is transmittable are different from each other among a plurality of the antenna panels.

(9)

The communication device according to any one of (3) to (8), in which the antenna panel configuration information includes information indicating the number of antenna panels that are capable of performing transmission in the same time resource.

(10)

The communication device according to any one of (1) to (9), in which the report information includes capability information indicating the number of beams that are receivable using a plurality of frequency resources in the same time resource.

(11)

The communication device according to (10), in which the capability information includes information indicating the number of frequency resources on which reception of a measurement signal that is beam-sweeping transmitted using the same time resource is performable.

(12)

The communication device according to any one of (1) to (11), in which the report information includes information indicating that measurement of a measurement signal that is beam-sweeping transmitted from the base station is abandoned.

(13)

A communication method including:

reporting, by a communication device including a plurality of antenna panels that each includes one or more antennas, report information regarding the number of beams that are transmittable or receivable in the same time resource to a base station on the basis of configurations of a plurality of the antenna panels.

(14)

A recording medium in which a program for causing a computer to function as a control section is recorded, the computer controlling a communication device including a plurality of antenna panels that each includes one or more antennas, and the control section reporting, to a base station, report information regarding the number of beams that are transmittable or receivable in the same time resource on the basis of configurations of a plurality of the antenna panels.

REFERENCE SIGNS LIST

1 System
11 Cell
20 Core network
30 PDN
40 Beam group
50 Digital circuit
51 Antenna weight
60 Analogue circuit
70 Antenna panel
71 Phase shifter
72 Antenna
100 Base station
110 Antenna section
120 Wireless communication section
130 Network communication section
140 Storage section
150 Control section
151 Setting section
153 Measurement signal transmitting section
155 Measurement section
200 Terminal device
210 Antenna section
220 Wireless communication section
230 Storage section
240 Control section
241 Reporting section
243 Measurement reporting section
245 Measurement signal transmitting section

The invention claimed is:

1. A communication device comprising:
a plurality of antenna panels that each includes one or more antennas; and
control circuitry that reports, to a base station, report information regarding a number of beams that are transmittable or receivable in a same time resource on a basis of configurations of a plurality of the antenna panels,
wherein the report information includes antenna panel configuration information indicating the configurations of a plurality of the antenna panels,
wherein the antenna panel configuration information includes information indicating arrangement of each of a plurality of the antenna panels,
wherein the antenna panel configuration information includes at least one of:
information indicating a number of antenna panels of which arrival directions in which a beam is receivable overlap each other among a plurality of the antenna panels,
information indicating a number of antenna panels that are capable of performing reception in a same time resource,
information indicating a number of antenna panels of which directions in which a beam is transmittable overlap each other among a plurality of the antenna panels, or
information indicating a number of antenna panels that are capable of performing transmission in a same time resource.

2. The communication device according to claim 1, wherein the antenna panel configuration information further includes information indicating a number of groups of the antenna panels, of which arrival directions in which a beam is receivable are different from each other among a plurality of the antenna panels.

3. The communication device according to claim 1, wherein the antenna panel configuration information further includes information indicating a number of groups of the antenna panels, of which directions in which a beam is transmittable are different from each other among a plurality of the antenna panels.

4. The communication device according to claim 1, wherein the report information further includes capability information indicating a number of beams that are receivable using a plurality of frequency resources in a same time resource.

5. The communication device according to claim 4, wherein the capability information includes information indicating a number of frequency resources on which reception of a measurement signal that is beam-sweeping transmitted using a same time resource is performable.

6. The communication device according to claim 1, wherein the report information further includes information indicating that measurement of a measurement signal that is beam-sweeping transmitted from the base station is abandoned.

7. A communication method performed by a communication device including a plurality of antenna panels that each includes one or more antennas, the method comprising:
reporting, by the communication device to a base station, report information regarding a number of beams that are transmittable or receivable in a same time resource on a basis of configurations of a plurality of the antenna panels,
wherein the report information includes antenna panel configuration information indicating the configurations of a plurality of the antenna panels,
wherein the antenna panel configuration information includes information indicating arrangement of each of a plurality of the antenna panels,
wherein the antenna panel configuration information includes at least one of:
information indicating a number of antenna panels of which arrival directions in which a beam is receivable overlap each other among a plurality of the antenna panels,
information indicating a number of antenna panels that are capable of performing reception in a same time resource, information indicating a number of antenna panels of which directions in which a beam is transmittable overlap each other among a plurality of the antenna panels, or information indicating a number of antenna panels that are capable of performing transmission in a same time resource.

8. A non-transitory recording medium containing a program recorded thereon for causing a computer to function as control circuitry, the computer controlling a communication device including a plurality of antenna panels that each includes one or more antennas, and the control circuitry reporting, to a base station, report information regarding the number of beams that are transmittable or receivable in a same time resource on a basis of configurations of a plurality of the antenna panels, wherein the report information includes antenna panel configuration information indicating the configurations of a plurality of the antenna panels, wherein the antenna panel configuration information includes information indicating arrangement of each of a plurality of the antenna panels, wherein the antenna panel configuration information includes at least one of:

information indicating a number of antenna panels of which arrival directions in which a beam is receivable overlap each other among a plurality of the antenna panels, information indicating a number of antenna panels that are capable of performing reception in a same time resource, information indicating a number of antenna panels of which directions in which a beam is transmittable overlap each other among a plurality of the antenna panels, or information indicating a number of antenna panels that are capable of performing transmission in a same time resource.

* * * * *